United States Patent
Logunov et al.

(10) Patent No.: US 10,676,240 B2
(45) Date of Patent: Jun. 9, 2020

(54) ANTI-COUNTERFEITING MEASURES FOR GLASS ARTICLES

(71) Applicant: CORNING INCORPORATED, Corning, NY (US)

(72) Inventors: Stephan Lvovich Logunov, Corning, NY (US); Leonard Thomas Masters, Painted Post, NY (US); William James Miller, Horseheads, NY (US); Alexander Mikhailovich Streltsov, Corning, NY (US); Christopher Lee Timmons, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/610,054

(22) Filed: May 31, 2017

(65) Prior Publication Data

US 2017/0340518 A1 Nov. 30, 2017

Related U.S. Application Data

(60) Provisional application No. 62/426,745, filed on Nov. 28, 2016, provisional application No. 62/343,289, filed on May 31, 2016.

(51) Int. Cl.
*B23K 26/00* (2014.01)
*C03C 23/00* (2006.01)
(Continued)

(52) U.S. Cl.
CPC ............ *B65D 23/00* (2013.01); *A61J 1/18* (2013.01); *B23K 26/0006* (2013.01);
(Continued)

(58) Field of Classification Search
CPC .... A61J 1/18; A61J 1/00; A61J 1/1468; A61J 1/065; B23K 26/0622; B23K 26/53;
(Continued)

(56) References Cited

U.S. PATENT DOCUMENTS 1,349,396 A * 8/1920 Clief ..................... G09F 3/0294
40/310
2,262,492 A * 11/1941 Farrell ................. G09F 3/0294
40/638
(Continued)

FOREIGN PATENT DOCUMENTS

DE 102008004995 B3 12/2008
EP 1293490 A1 3/2003
(Continued)

OTHER PUBLICATIONS

International Search Report and Written Opinion dated Nov. 21, 2017, for PCT/US2017/035246 filed May 31, 2017. pp. 1-30.
(Continued)

*Primary Examiner* — Gideon R Weinerth
(74) *Attorney, Agent, or Firm* — Dinsmore & Shohl LLP

(57) ABSTRACT

A glass container including a body having a delamination factor less than or equal to 10 and at least one marking is described. The body has an inner surface, an outer surface, and a wall thickness extending between the outer surface and the inner surface. The marking is located within the wall thickness. In particular, the marking is a portion of the body having a refractive index that differs from a refractive index of an unmarked portion of the body. Methods of forming the marking within the body are also described.

7 Claims, 11 Drawing Sheets

(51) Int. Cl.

| | |
|---|---|
| *B65D 25/34* | (2006.01) |
| *B65D 23/00* | (2006.01) |
| *B41M 5/26* | (2006.01) |
| *G06K 19/06* | (2006.01) |
| *C03C 17/28* | (2006.01) |
| *G06K 9/00* | (2006.01) |
| *G06K 1/12* | (2006.01) |
| *B42D 25/41* | (2014.01) |
| *C03C 21/00* | (2006.01) |
| *C03C 3/087* | (2006.01) |
| *B23K 26/361* | (2014.01) |
| *B41M 3/14* | (2006.01) |
| *B42D 25/328* | (2014.01) |
| *G06K 19/16* | (2006.01) |
| *B23K 26/0622* | (2014.01) |
| *B23K 26/53* | (2014.01) |
| *C03C 15/00* | (2006.01) |
| *A61J 1/18* | (2006.01) |
| *B23K 26/362* | (2014.01) |
| *B65D 1/02* | (2006.01) |
| *B23K 103/00* | (2006.01) |
| *B41M 5/24* | (2006.01) |

(52) U.S. Cl.
CPC ........ *B23K 26/0622* (2015.10); *B23K 26/361* (2015.10); *B23K 26/362* (2013.01); *B23K 26/53* (2015.10); *B41M 3/14* (2013.01); *B41M 5/262* (2013.01); *B42D 25/328* (2014.10); *B42D 25/41* (2014.10); *B65D 1/0207* (2013.01); *B65D 1/0215* (2013.01); *C03C 3/087* (2013.01); *C03C 15/00* (2013.01); *C03C 17/28* (2013.01); *C03C 21/002* (2013.01); *C03C 23/0025* (2013.01); *G06K 1/12* (2013.01); *G06K 9/00577* (2013.01); *G06K 19/06037* (2013.01); *G06K 19/06178* (2013.01); *G06K 19/16* (2013.01); *B23K 2103/54* (2018.08); *B41M 5/24* (2013.01); *B65D 2203/06* (2013.01); *C03C 2218/328* (2013.01); *G06K 2009/0059* (2013.01); *Y10T 428/131* (2015.01); *Y10T 428/24802* (2015.01)

(58) Field of Classification Search
CPC ............. B23K 26/0006; B23K 26/362; B23K 2103/54; B42D 25/41; B42D 25/328; B65D 1/0215; B65D 1/0207; B65D 23/00; B65D 2203/06; B65D 49/00; B65D 79/02; C03C 3/087; C03C 15/00; C03C 17/28; C03C 21/002; C03C 2218/328; C03C 23/0025; C03C 21/0025; C03C 23/00; C03C 2217/74; G06K 1/12; G06K 9/00577; G06K 19/06037; G06K 19/06046; G06K 19/06178; G06K 19/16; G06K 2009/0059; G01J 1/02; G06Q 30/0185; B41M 5/267; B41M 5/262; B41M 3/144; B41M 5/24; G01N 21/64
USPC ............. 433/90, 23; 219/121.68, 400, 121.6, 219/121.85, 121.69; 206/459.5, 459.1; 428/195.1, 206, 207, 208
See application file for complete search history.

(56) References Cited

U.S. PATENT DOCUMENTS

| | | | | |
|---|---|---|---|---|
| 2,318,089 | A * | 5/1943 | Mattin | C09D 5/22 250/487.1 |
| 2,763,785 | A * | 9/1956 | Switzer | C09D 5/22 250/461.1 |
| 2,929,931 | A * | 3/1960 | Ferdinand | G09F 3/00 250/461.1 |
| 3,832,948 | A * | 9/1974 | Barker | B23K 26/18 101/401.1 |
| 4,092,518 | A * | 5/1978 | Merard | B44B 7/00 219/121.69 |
| 4,264,658 | A * | 4/1981 | Tobias | C03C 17/32 427/518 |
| 4,323,317 | A * | 4/1982 | Hasegawa | B41J 2/45 101/35 |
| 4,491,940 | A | 1/1985 | Tinet | |
| 4,515,867 | A * | 5/1985 | Bleacher | B44B 7/002 283/70 |
| 4,621,193 | A * | 11/1986 | Van Hoye | G01N 21/91 250/302 |
| 4,990,792 | A * | 2/1991 | Frei | B41M 5/24 235/488 |
| 5,003,600 | A | 3/1991 | Deason et al. | |
| 5,005,873 | A * | 4/1991 | West | G06K 19/14 235/491 |
| 5,061,341 | A * | 10/1991 | Kildal | B23K 26/18 216/65 |
| 5,206,496 | A * | 4/1993 | Clement | B29C 71/04 219/121.6 |
| 5,321,227 | A * | 6/1994 | Fuchs | B23K 26/0738 219/121.68 |
| 5,432,329 | A | 7/1995 | O'Boyle et al. | |
| 5,445,923 | A * | 8/1995 | Takahashi | B41M 5/267 430/340 |
| 5,480,722 | A * | 1/1996 | Tomonaga | B32B 17/06 359/359 |
| 5,516,362 | A * | 5/1996 | Gundjian | B41M 3/142 106/31.15 |
| 5,637,244 | A * | 6/1997 | Erokhin | B41M 5/26 219/121.69 |
| 5,653,900 | A * | 8/1997 | Clement | B23K 26/0838 219/121.68 |
| 5,683,786 | A * | 11/1997 | Kavanaugh | C03C 17/00 356/244 |
| 5,762,377 | A * | 6/1998 | Chamberlain | G09F 3/00 283/101 |
| 5,767,483 | A * | 6/1998 | Cameron | B41M 5/267 219/121.85 |
| 6,154,593 | A * | 11/2000 | Miura | G02B 6/13 385/123 |
| 6,238,847 | B1 * | 5/2001 | Axtell, III | B41M 5/262 427/555 |
| 6,372,293 | B1 * | 4/2002 | Mathus | B41M 5/24 427/271 |
| 6,573,026 | B1 * | 6/2003 | Aitken | C03C 23/0025 385/123 |
| 6,596,966 | B1 | 7/2003 | Kickelhain et al. | |
| 6,780,012 | B1 * | 8/2004 | Peterson | A61C 7/18 219/121.68 |
| 6,796,148 | B1 | 9/2004 | Borrelli et al. | |
| 7,253,422 | B2 * | 8/2007 | Smith | B41M 3/144 250/492.1 |
| 7,632,420 | B2 * | 12/2009 | Thomas | B08B 7/0042 134/1.1 |
| 7,675,001 | B2 * | 3/2010 | Leyvraz | C03C 23/0025 216/31 |
| 7,856,795 | B2 | 12/2010 | Grimard | |
| 8,122,740 | B2 * | 2/2012 | Lesche | C03C 23/0025 219/121.6 |
| 8,809,733 | B2 * | 8/2014 | Scott | B41M 5/262 219/121.69 |
| 9,034,442 | B2 * | 5/2015 | Chang | B65D 25/14 428/34.1 |
| 9,173,336 | B2 * | 10/2015 | Bhatia | H05K 13/0084 |
| 9,209,400 | B2 * | 12/2015 | Hayton | H01L 51/0023 |
| 9,259,800 | B2 * | 2/2016 | Hansen | B23K 26/352 |
| 9,272,308 | B2 * | 3/2016 | Yashiki | G02B 5/1842 |
| 9,378,445 | B2 * | 6/2016 | Stuck | B23K 26/048 |
| 9,844,951 | B2 * | 12/2017 | Krief | A61M 5/3129 |
| 10,012,598 | B2 * | 7/2018 | Huibregtse | G01N 21/9054 |
| 2001/0028390 | A1 | 10/2001 | Hayashi | |

(56) References Cited

U.S. PATENT DOCUMENTS

| | | | |
|---|---|---|---|
| 2002/0041323 A1 | 4/2002 | Hayashi et al. | |
| 2002/0143671 A1* | 10/2002 | Afzali-Ardakani | G06K 19/06028 705/28 |
| 2005/0189255 A1* | 9/2005 | Safian | B65D 51/245 206/459.5 |
| 2005/0194280 A1* | 9/2005 | Smith | G09F 23/00 206/459.5 |
| 2006/0071075 A1 | 4/2006 | Moon et al. | |
| 2008/0026319 A1* | 1/2008 | Stroh, III | B41M 5/26 430/270.1 |
| 2008/0149584 A1 | 6/2008 | Martinelli | |
| 2009/0159654 A1* | 6/2009 | Grimard | A61J 1/00 235/375 |
| 2010/0119808 A1* | 5/2010 | Li | B41M 5/26 428/312.6 |
| 2010/0289186 A1* | 11/2010 | Longo | G03F 1/72 264/400 |
| 2010/0294426 A1* | 11/2010 | Nashner | B05D 5/06 156/273.3 |
| 2012/0133933 A1* | 5/2012 | Zou | G01N 21/0303 356/301 |
| 2013/0101596 A1* | 4/2013 | DeMartino | A61J 1/00 424/142.1 |
| 2013/0169732 A1 | 7/2013 | Witzmann et al. | |
| 2013/0320079 A1* | 12/2013 | Nordin | G06K 5/00 235/375 |
| 2013/0327740 A1* | 12/2013 | Adib | C03C 3/087 215/379 |
| 2013/0341228 A1* | 12/2013 | Click | C03C 23/0005 206/459.5 |
| 2014/0001143 A1* | 1/2014 | Fadeev | C03C 17/005 215/12.2 |
| 2014/0001181 A1* | 1/2014 | Sharma | C03C 17/005 220/62.15 |
| 2014/0028011 A1* | 1/2014 | Yamauchi | B41M 3/14 283/74 |
| 2014/0034544 A1* | 2/2014 | Chang | B65D 25/14 206/524.3 |
| 2014/0172636 A1* | 6/2014 | Kutlualp | G06Q 10/10 705/26.35 |
| 2014/0291495 A1* | 10/2014 | Fischer | C09K 11/02 250/216 |
| 2014/0306441 A1* | 10/2014 | Lister | G03C 5/08 283/85 |
| 2014/0341891 A1* | 11/2014 | Weeks | C03C 21/002 424/133.1 |
| 2014/0342464 A1* | 11/2014 | Cooper | B65D 25/205 436/164 |
| 2015/0028110 A1* | 1/2015 | Bryant | G06K 19/06037 235/494 |
| 2015/0071913 A1* | 3/2015 | Weeks | C03C 3/087 424/133.1 |
| 2015/0165560 A1* | 6/2015 | Hackert | C03B 33/082 428/43 |
| 2015/0183257 A1* | 7/2015 | Glendenning | B42D 25/425 206/459.5 |
| 2015/0366756 A1 | 12/2015 | Weeks et al. | |
| 2015/0368150 A1* | 12/2015 | Gross | C03C 3/097 501/63 |
| 2016/0145150 A1* | 5/2016 | Bookbinder | C03C 15/00 65/31 |
| 2016/0229736 A1* | 8/2016 | Gross | C03C 3/097 |
| 2016/0343002 A1* | 11/2016 | Hernandez Suarez | G06K 19/08 |
| 2017/0228629 A1* | 8/2017 | Albinyana | G06K 7/14 |
| 2017/0235987 A1* | 8/2017 | Hirschmann | G06F 19/00 235/462.1 |
| 2017/0330156 A1* | 11/2017 | Kato | B23K 26/53 |
| 2017/0340518 A1* | 11/2017 | Logunov | B23K 26/0622 |
| 2017/0341812 A1* | 11/2017 | DeMartino | B23K 26/0622 |
| 2018/0105451 A1* | 4/2018 | Wieland | B23K 26/082 |
| 2018/0114083 A1* | 4/2018 | Richter | G06K 7/10861 |
| 2019/0134742 A1* | 5/2019 | Fang | B23K 26/0622 |
| 2020/0009891 A1* | 1/2020 | Nashner | B44C 3/005 |

FOREIGN PATENT DOCUMENTS

| | | |
|---|---|---|
| EP | 2975575 A1 | 1/2016 |
| FR | 3017483 A1 | 8/2015 |
| FR | 3017971 A1 | 8/2015 |
| WO | 2004000749 A1 | 12/2003 |
| WO | 2006020363 A2 | 2/2006 |
| WO | 2009115611 A2 | 9/2009 |
| WO | 2010084291 A1 | 7/2010 |
| WO | 2011022664 A1 | 2/2011 |
| WO | 2012164489 A1 | 12/2012 |
| WO | 2012174545 A1 | 12/2012 |
| WO | 2014196655 A2 | 12/2014 |
| WO | 2015139929 A1 | 9/2015 |

OTHER PUBLICATIONS

Zai-Qing Wen et al., Rapid Communications, "Nondestructive detection of glass vial inner surface morphology with differential interference contrast microscopy", Journal of Pharmaceutical Sciences, vol. 101, No. 4, Apr. 1, 2012 (Apr. 1, 2012), pp. 1378-1384, XP055050536, ISSN: 0022-3549, DOI: 10.1002/jps.23048.

V.A. Gnatyuk et al., Laser Marking in Transparent Materials and Mechanisms of Laser-Induced Defect Formation, Conf. on Photonic Technologies, 2014 Fotonica AEIT Italian, pp. 1-4.

H. Hayakawa, A laser method for marking bar codes on glass substrates, Proceedings of SPIE vol. 4088 (2000), p. 363-366.

\* cited by examiner

ANTI-COUNTERFEITING MEASURES FOR GLASS ARTICLES

CROSS REFERENCE TO RELATED APPLICATIONS

The present application claims priority to U.S. Provisional Application No. 62/343,289 filed May 31, 2016, entitled, "Anti-Counterfeiting Measures for Glass Articles," and U.S. Provisional Application No. 62/426,745 filed Nov. 28, 2016, entitled, "Anti-Counterfeiting Measures for Glass Articles," the entireties of which are incorporated by reference herein.

BACKGROUND

Field

The present specification generally relates to glass articles and, more particularly, to glass articles having anti-counterfeiting features formed within the glass article.

Technical Background

It is estimated that up to 30% of the pharmaceutical drug supply in developing countries is counterfeit, posing regulatory and health risks to end users. In order to combat counterfeiting, regulatory bodies may require that pharmaceutical companies track and trace products through the supply chain.

Tracking of individual doses and/or products can be accomplished by covert and/or overt markers. While overt markers, which are visible to consumers and potential counterfeiters, can prevent or deter counterfeiting and improve traceability, covert markers, which may be difficult to observe with the naked eye, can limit interrogation of the mark and increase the difficulty of duplicating the mark.

Accordingly, alternative glass articles that include anti-counterfeiting features are desired.

SUMMARY

According to one embodiment, a glass container includes a body having a delamination factor less than or equal to 10 and at least one marking. The body has an inner surface, an outer surface, and a wall thickness extending between the outer surface and the inner surface. The marking is located within the wall thickness. In particular, the marking is a portion of the body having a refractive index that differs from a refractive index of an unmarked portion of the body.

According to another embodiment, a method of forming an anti-counterfeit marking in a glass container is provided. The method includes focusing a pulsed laser beam at a point within a wall thickness of a body formed from an alkali-aluminosilicate glass composition and translating the pulsed laser beam along a scan path within the wall thickness effective to induce a change in a refractive index along the scan path relative to a refractive index of a portion of the body unexposed to the pulsed laser beam.

According to another embodiment, a method of forming an anti-counterfeit marking in a glass article is provided. The method includes focusing a pulsed laser beam at a point on a surface of a glass body formed from an alkali-aluminosilicate glass composition and translating the pulsed laser beam along a scan path along the surface effective to remove a polymer-based coating from the surface of the glass body, thereby forming the anti-counterfeit marking on the glass article.

According to another embodiment, a method of detecting an anti-counterfeit marking on a glass article is provided. The method includes directing a light source toward a surface containing the anti-counterfeit marking at a projection angle of from about 0° to about 45°, and projecting the anti-counterfeit marking onto an image plane for detection. In various embodiments, the anti-counterfeit marking is not detectable through direct inspection or by direct illumination with the light source.

According to yet another embodiment, a glass article includes a body having a delamination factor of less than or equal to 10. The body has an inner surface, an outer surface, and a wall thickness extending between the outer surface and the inner surface. The glass article further includes a polymer-based coating disposed on at least a portion of the outer surface of the body and a marking within the polymer-based coating. The marking includes at least a portion of the polymer-based coating that has been removed from the outer surface of the body.

In another embodiment, a method of forming an anti-counterfeit marking in a glass article is provided. The method includes focusing, using a lens having a numerical aperture of from 0.3 to 0.7, a laser at a point within a thickness of a wall of a glass body formed from an alkali-aluminosilicate glass composition prior to annealing the glass body. The method also includes operating the laser at a repetition rate of from about 80 kHz to about 300 kHz and translating the laser along a scan path, thereby forming the anti-counterfeit marking in the glass article.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
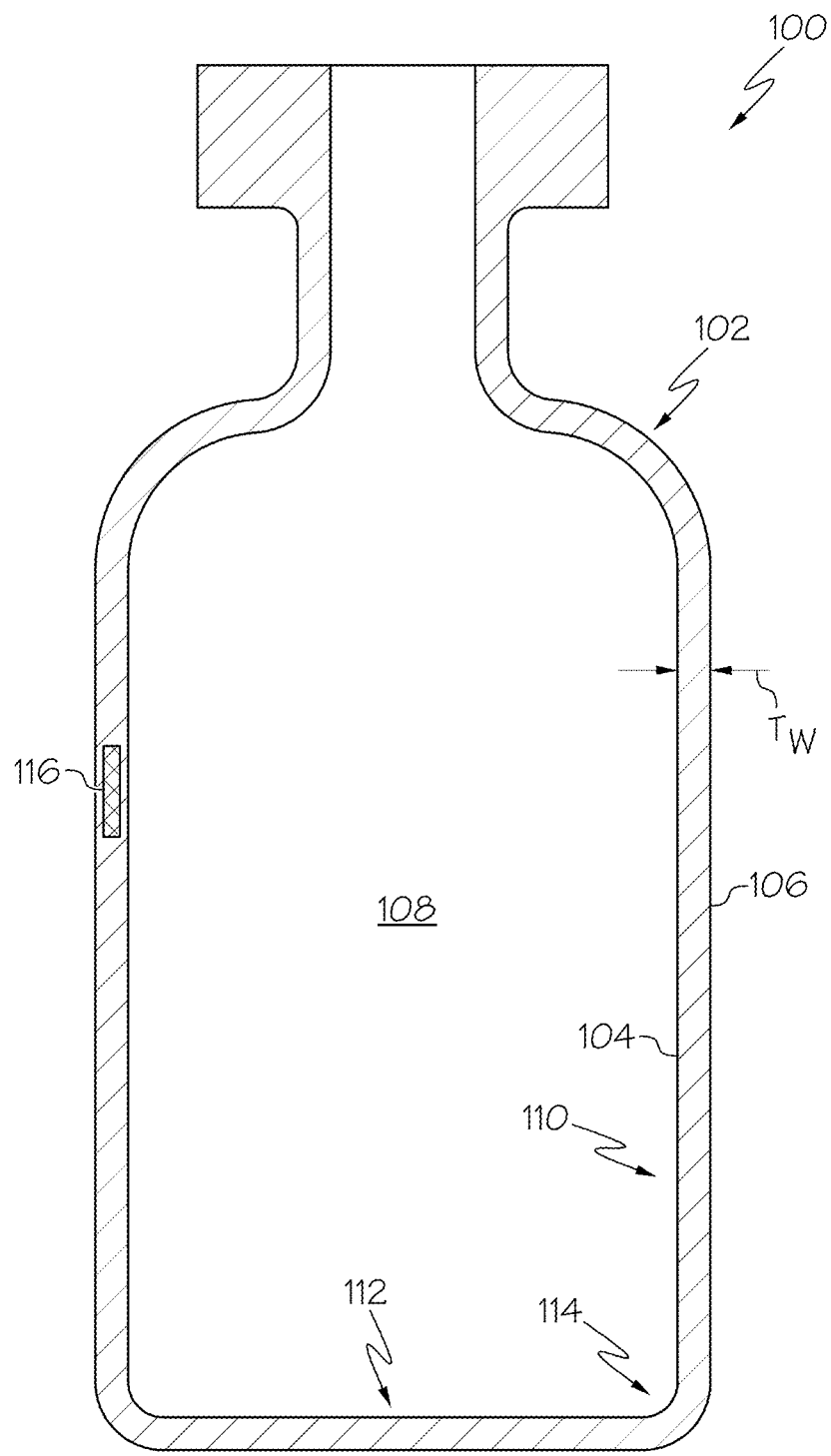
FIG. 1 schematically depicts a cross section of a glass container in accordance with one or more embodiments described herein.

Reference will now be made in detail to various embodiments of methods for forming anti-counterfeit markings within a glass container and of glass containers including anti-counterfeit markings, examples of which are illustrated in the accompanying drawings. One example of a glass container with an anti-counterfeit marking is schematically depicted in FIG. 1. The glass containers described herein are strengthened glass containers which have a resistance to delamination and damage. The markings described herein for inclusion in the glass containers may be overt, covert, or a combination of overt and covert, enabling the glass containers to be tracked or validated as authentic. In particular, the markings are included within a wall thickness of the glass container, and have minimal impact on the strength, delamination resistance, and/or damage resistance. Various embodiments of glass containers with anti-counterfeit markings and methods for making the same will be described in further detail herein with specific reference to the appended drawings.

In the embodiments of the glass compositions described herein, the concentration of constituent components (e.g., $SiO_2$, $Al_2O_3$, $B_2O_3$, and the like) is specified in mole percent (mol. %) on an oxide basis, unless otherwise specified.

The term "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.1 mol. %.

Figure 2:
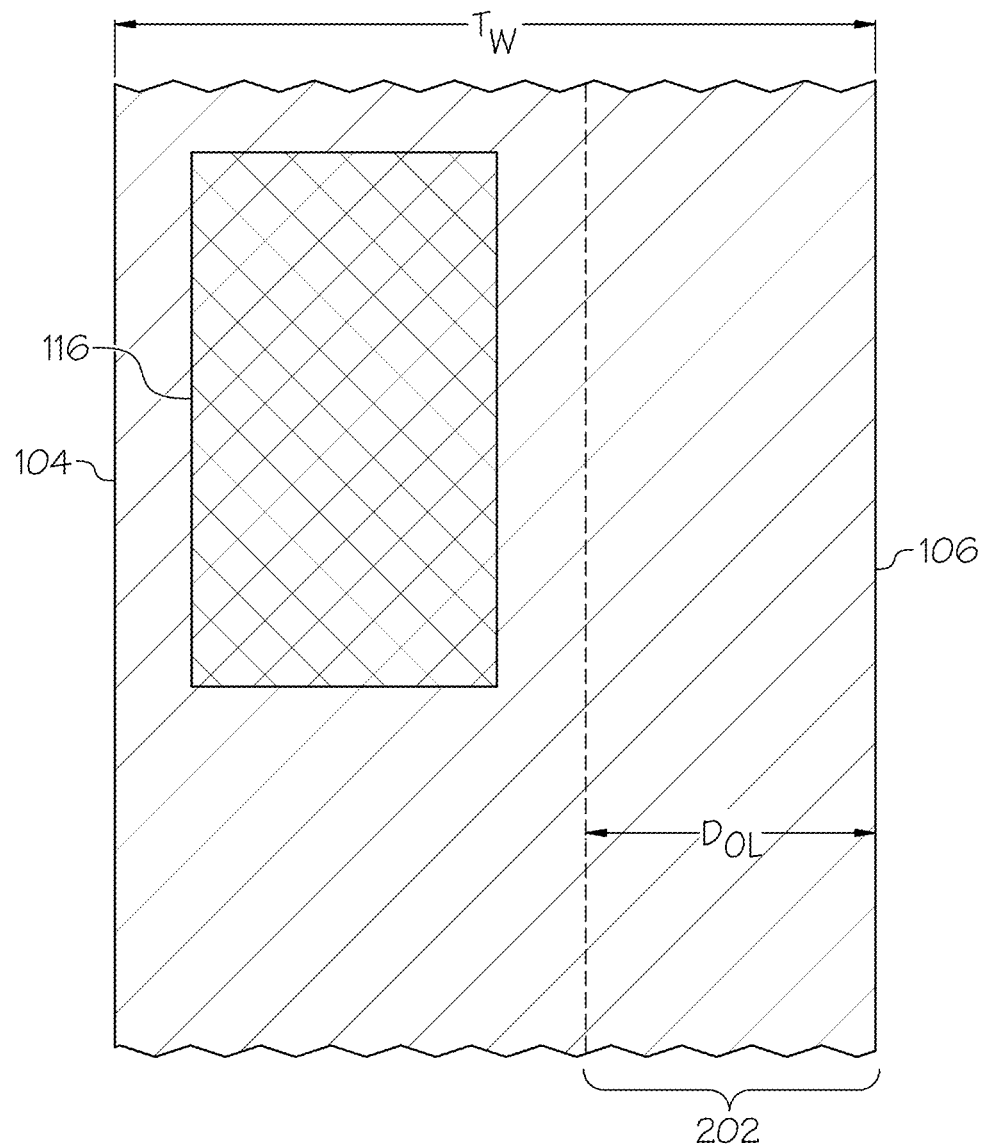
FIG. 2 schematically depicts a compressively stressed layer in a portion of the sidewall of the glass container of FIG. 1.

Referring now to FIGS. 1 and 2, one embodiment of a glass container 100 for storing a pharmaceutical formulation is schematically depicted in cross section. Although various embodiments described herein employ glass containers, it is further contemplated that the methodologies described may be implemented in other types of containers, such as plastic containers or the like. The glass container 100 generally comprises a body 102. The body 102 extends between an inner surface 104 and an outer surface 106 and generally encloses an interior volume 108. In the embodiment of the glass container 100 shown in FIG. 1, the body 102 generally comprises a wall portion 110 and a floor portion 112. The wall portion 110 transitions into the floor portion 112 through a heel portion 114. The body 102 has a wall thickness $T_w$ which extends between the inner surface 104 and the outer surface 106, as depicted in FIG. 1.

The glass container 100 also includes at least one marking 116 within the wall thickness $T_w$. As will be described in greater detail hereinbelow, the marking 116 has a refractive index that differs from a refractive index of an unmarked portion of the body 102. The marking may be overt (visible to the human eye without the use of special equipment or the like), covert (difficult to observe or unobservable to the human eye without the use of special equipment), or a combination of overt and covert, depending on the particular embodiment. In various embodiments, the marking 116 may include a unique identification for identifying the lot, product, manufacturer, or individual package, a one-dimensional or two-dimensional barcode, or it may be a design, pattern, or other form of marking. In one particular embodiment, the marking 116 may be located such that it works synergistically with an applied label to increase the complexity of the marking and further deter duplication. For example, the marking 116 may cause a visually observable change to the label, or the label may obscure all or part of the marking 116 to reduce the likelihood of observation by the human eye.

In FIG. 1, the marking 116 is depicted as being located in a wall portion 110 of the glass container. However, it should be understood that other locations are contemplated and possible. For example, in some embodiments, the marking 116 may be located in the heel portion 114, the floor portion 112, or in a flange or neck of the glass container 100. In some embodiments, the marking 116 is located in an area of the glass container 100 that is less sensitive to stresses and damage. For example, in such embodiments, the marking 116 may be located in an area of the glass container 100 other than the floor portion 112.

While the glass container 100 is depicted in FIG. 1 as having a specific shape form (i.e., a vial), it should be understood that the glass container 100 may have other shape forms, including, without limitation, Vacutainers®, cartridges, syringes, ampoules, bottles, flasks, phials, tubes, beakers, or the like. Further, it should be understood that the glass containers described herein may be used for a variety of applications including, without limitation, as pharmaceutical packages, beverage containers, or the like.

Referring to FIGS. 1 and 2, the body 102 of the glass container 100 includes a compressively stressed layer 202 extending from at least the outer surface 106 of the body 102 and into the wall thickness $T_w$ to a depth of layer DOL from the outer surface 106 of the body 102. The compressively stressed layer 202 generally increases the strength of the glass container 100 and also improves the damage tolerance of the glass container 100. Specifically, a glass container having a compressively stressed layer 202 is generally able to withstand a greater degree of surface damage, such as scratches, chips, or the like, without failure compared to a non-strengthened glass container as the compressively stressed layer 202 mitigates the propagation of cracks from surface damage in the compressively stressed layer 202.

In the embodiments described herein, the depth of layer of the compressively stressed layer may be greater than or equal to about 3 μm. In some embodiments, the depth of layer may be greater than or equal to about 25 µm or even greater than or equal to about 30 µm. For example, in some embodiments, the depth of layer may be greater than or equal to about 25 µm and up to about 150 µm. In some other embodiments, the depth of layer may be greater than or equal to about 30 µm and less than or equal to about 150 µm. In yet other embodiments, the depth of layer may be greater than or equal to about 30 µm and less than or equal to about 80 µm. In some other embodiments, the depth of layer may be greater than or equal to about 35 µm and less than or equal to about 50 µm.

The compressively stressed layer 202 generally has a surface compressive stress (i.e., a compressive stress as measured at the outer surface 106) of greater than or equal to 150 MPa. In some embodiments, the surface compressive stress may be greater than or equal to 200 MPa, or even greater than or equal to 250 MPa. In some embodiments, the surface compressive stress may be greater than or equal to 300 MPa, or even greater than or equal to 350 MPa. For example, in some embodiments, the surface compressive stress may be greater than or equal to about 300 MPa and less than or equal to about 750 MPa. In some other embodiments, the surface compressive stress may be greater than or equal to about 400 MPa and less than or equal to about 700 MPa. In still other embodiments, the surface compressive stress may be greater than or equal to about 500 MPa and less than or equal to about 650 MPa. The stress in ion-exchanged glass articles can be measured with an FSM (Fundamental Stress Meter) instrument. This instrument couples light into and out of the birefringent glass surface. The measured birefringence is then related to stress through a material constant, the stress-optic or photoelastic coefficient (SOC or PEC). Two parameters are obtained: the maximum surface compressive stress (CS) and the exchange depth of layer (DOL).

Any of a variety of techniques known in the art may be utilized to form the compressively stressed layer 202 in the body 102 of the glass container 100. For example, the compressively stressed layer 202 may be formed in the body 102 by ion exchange, thermal tempering, or by forming the glass container from laminated glass.

While the compressively stressed layer 202 has been shown and described herein as extending from the outer surface 106 into the wall thickness $T_w$ of the body 102, it should be understood that, in some embodiments, the body 102 may further comprise a second compressively stressed layer which extends from the inner surface 104 into the wall thickness $T_w$ of the body 102. In such embodiments, the depth of layer and surface compressive stress of the second compressively stressed layer may mirror those of the compressively stressed layer 202 about the centerline of the wall thickness $T_w$ of the body 102.

In various embodiments, such as the embodiment depicted in FIG. 2, the marking 116 is not within the compressively stressed layer 202. In other words, the marking 116 may be external to the compressively stressed layer 202 and within a portion of the wall thickness $T_w$ that does not include the depth of layer. Depending on the depth of layer, in some embodiments, the marking 116 may be within a middle 80% of the wall thickness, within a middle 75% of the wall thickness, a middle 50% of the wall thickness, or even a middle 30% of the wall thickness. For example, when the marking 116 is within a middle 80% of the wall thickness, 10% of the wall thickness is on each side of the marking 116. However, in some embodiments, the marking 116 extends through substantially the entire wall thickness $T_w$ but does not extend to the surface. In still other embodiments, the marking 116 may be within the compressively stressed layer 202.

In various embodiments, the glass container 100 is also resistant to delamination following long term exposure to certain chemical compositions stored in the container. Delamination refers to a phenomenon in which glass particles are released from the surface of the glass following a series of leaching, corrosion, and/or weathering reactions. Additional details on delamination, including testing suitable for assaying delamination of glass containers may be found in, for example, U.S. Patent Application Publication No. 2015/0366756, entitled "Delamination Resistant Pharmaceutical Glass Containers Containing Active Pharmaceutical Ingredients" and filed Sep. 4, 2015, the entire contents of which is hereby incorporated by reference. In general, the glass particles are silica-rich flakes of glass which originate from the inner surface of the package as a result of the leaching of modifier ions into a solution contained within the package. These flakes may generally be from about 1 nm to 2 µm thick with a width greater than about 50 µm.

It has heretofore been hypothesized that delamination is due to the compositional characteristics of the glass container in its as-formed condition. Specifically, the high silica content of the alkali borosilicate glasses increases the melting temperature of the glass. However, the alkali and borate components in the glass composition melt and/or vaporize at much lower temperatures. In particular, the borate species in the glass are highly volatile and evaporate from the surface of the glass at the high temperatures necessary to melt and form the glass. The high temperatures cause the volatile borate species to evaporate from portions of the surface of the glass. When this evaporation occurs within the interior volume of the glass container, the volatilized borate species are re-deposited in other areas of the glass causing compositional hetereogeneities in the glass container, particularly with respect to the bulk of the glass container. For example, as one end of a glass tube is closed to form the bottom or floor of the container, borate species may evaporate from the bottom portion of the tube and be re-deposited elsewhere in the tube. As a result, the areas of the container exposed to higher temperatures have silica-rich surfaces. Other areas of the container which are amenable to boron deposition may have a silica-rich surface with a boron-rich layer below the surface. Areas amenable to boron deposition are at a temperature greater than the anneal point of the glass composition but less than the hottest temperature the glass is subjected to during reformation when the boron is incorporated into the surface of the glass. Solutions contained within the container may leach the boron from the boron-rich layer. As the boron-rich layer is leached from the glass, the silica-rich surface begins to spall, shedding silica-rich flakes into the solution.

The resistance to delamination may be characterized by the number of glass particulates present in a solution contained within the glass container 100 after exposure to the solution under specific conditions. In order to assess the long-term resistance of the glass container 100 to delamination, an accelerated delamination test may be utilized, such as the test described in U.S. Patent Application Publication No. 2013/0327740 filed on Jun. 7, 2013 and entitled "Delamination Resistant Glass Containers," which is incorporated by reference in its entirety.

It should be understood that accelerated delamination tests may be used to identify particles which are shed from the interior wall(s) of the glass container due to delamination and not tramp particles present in the container from forming processes or particles which precipitate from the solution enclosed in the glass container as a result of reactions between the solution and the glass. Specifically, delamination particles may be differentiated from tramp glass particles based on the aspect ratio of the particle (i.e., the ratio of the width of the particle to the thickness of the particle). Delamination produces particulate flakes or lamellae which are irregularly shaped and are typically >50 μm in diameter but often >200 μm. The thickness of the flakes is usually greater than about 100 nm and may be as large as about 1 μm. Thus, the minimum aspect ratio of the flakes is typically >50. The aspect ratio may be greater than 100 and sometimes greater than 1000. Particulates resulting from delamination processes generally have an aspect ratio of greater than about 50. In contrast, tramp glass particles will generally have a low aspect ratio which is less than about 3. Accordingly, particulates resulting from delamination may be differentiated from tramp particles based on aspect ratio during observation with a microscope. Validation results can be accomplished by evaluating the heel region of tested containers.

In various embodiments described herein, glass containers which average less than 10 glass particles with a minimum length of about 50 μm and an aspect ratio of greater than about 50 per trial following accelerated delamination testing are considered to have a delamination factor of 10. In some embodiments, glass containers which average less than 9 glass particles with a minimum length of about 50 μm and an aspect ratio of greater than about 50 per trial following accelerated delamination testing are considered to have a delamination factor of 9. In other embodiments, glass containers which average less than 8 glass particles with a minimum length of about 50 μm and an aspect ratio of greater than about 50 per trial following accelerated delamination testing are considered to have a delamination factor of 8. In various embodiments described herein, glass containers which average less than 7 glass particles with a minimum length of about 50 μm and an aspect ratio of greater than about 50 per trial following accelerated delamination testing are considered to have a delamination factor of 7. In still other embodiments described herein, glass containers which average less than 6 glass particles with a minimum length of about 50 μm and an aspect ratio of greater than about 50 per trial following accelerated delamination testing are considered to have a delamination factor of 6.

In some embodiments described herein, glass containers which average less than 5 glass particles with a minimum length of about 50 μm and an aspect ratio of greater than about 50 per trial following accelerated delamination testing are considered to have a delamination factor of 5. In other embodiments described herein, glass containers which average less than 4 glass particles with a minimum length of about 50 μm and an aspect ratio of greater than about 50 per trial following accelerated delamination testing are considered to have a delamination factor of 4. In embodiments described herein, glass containers which average less than 3 glass particles with a minimum width of 50 μm and an aspect ratio of greater than 50 per trial following accelerated delamination testing are considered to have a delamination factor of 3. In embodiments described herein, glass containers which average less than 2 glass particles with a minimum width of 50 μm and an aspect ratio of greater than 50 per trial following accelerated delamination testing are considered to have a delamination factor of 2. In embodiments described herein, glass containers which average less than 1 glass particle with a minimum width of 50 μm and an aspect ratio of greater than 50 per trial following accelerated delamination testing are considered to have a delamination factor of 1. In embodiments described herein, glass containers which average less than 0 glass particles with a minimum width of 50 μm and an aspect ratio of greater than 50 per trial following accelerated delamination testing are considered to have a delamination factor of 0. Accordingly, it should be understood that the lower the delamination factor, the better the resistance of the glass container to delamination. In various embodiments described herein, the glass containers have a delamination factor of 10 or lower, a delamination factor of 5 or lower, or even a delamination factor of 3 or lower (i.e., a delamination factor of 3, 2, 1, or 0).

A glass container having a delamination factor of 10 or lower may be obtained according to various techniques. For example, the glass container may be formed with a barrier coating on the inner surface of the body or the glass container may be formed such that the glass container has homogenous compositional characteristics which, in turn, reduces the susceptibility of the glass container to delamination. Glass containers having homogenous compositional characteristics may have persistent layer homogeneity or persistent surface homogeneity.

Figure 3:
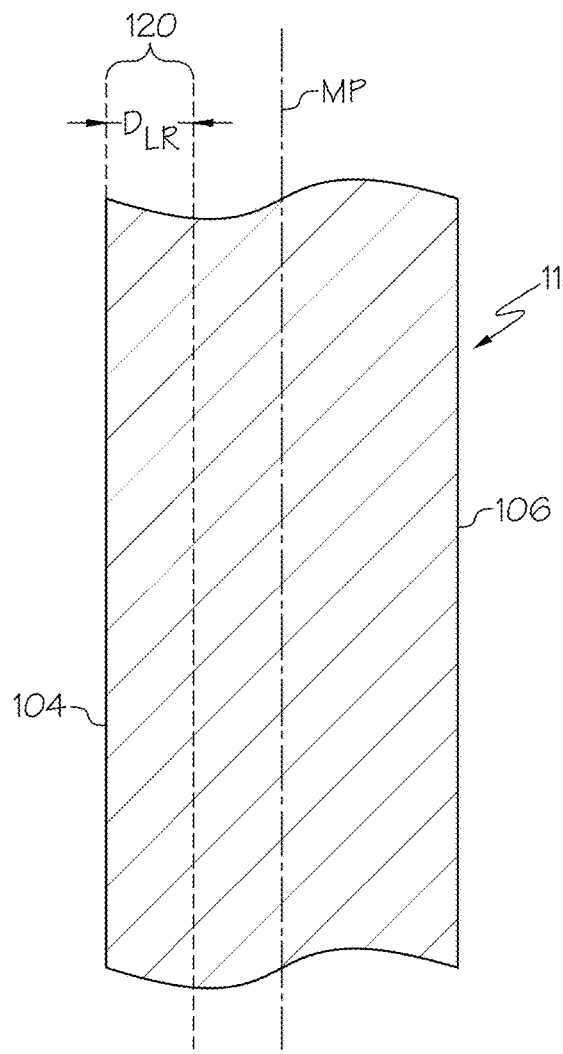
FIG. 3 schematically depicts a portion of a sidewall of a glass container having a persistent layer homogeneity.

In embodiments described herein, the phrase "persistent layer homogeneity" means that the concentrations of the constituent components (e.g., $SiO_2$, $Al_2O_3$, $Na_2O$, etc.) of the glass composition in the interior region do not vary from the concentration of the same constituent components at the midpoint of a thickness of the body (i.e., at a point along the midpoint MP which evenly bisects the body between the inner surface 104 and the outer surface 106) by an amount which would result in delamination of the body upon long term exposure to a solution contained within the container. For example, as shown in FIG. 3, a partial cross-section of a wall portion 110 of the glass container 100 is depicted. The body 102 of the glass container 100 has an interior region 120 which extends from below the inner surface 104 of the glass container 100 into the wall thickness $T_w$ of the wall portion 110 to a depth $D_{LR}$ from the inner surface 104 of the glass container. The glass composition within the interior region 120 has a persistent layer homogeneity which, in conjunction with the depth $D_{LR}$ of the interior region, is sufficient to prevent delamination of the inner surface 104 of the body 102 following long term exposure to a solution contained in the interior volume of the glass container. In various embodiments, providing an interior region which is homogenous in composition (i.e., the extrema of the concentration of the constituent components in the interior region is within +/−20% of the same constituent components at the midpoint of the thickness of the body) avoids the localized concentration of constituent components of the glass composition which may be susceptible to leaching which, in turn, mitigates the loss of glass particles from the inner surface of the glass container in the event that these constituent components are leached from the glass surface.

Figure 4:
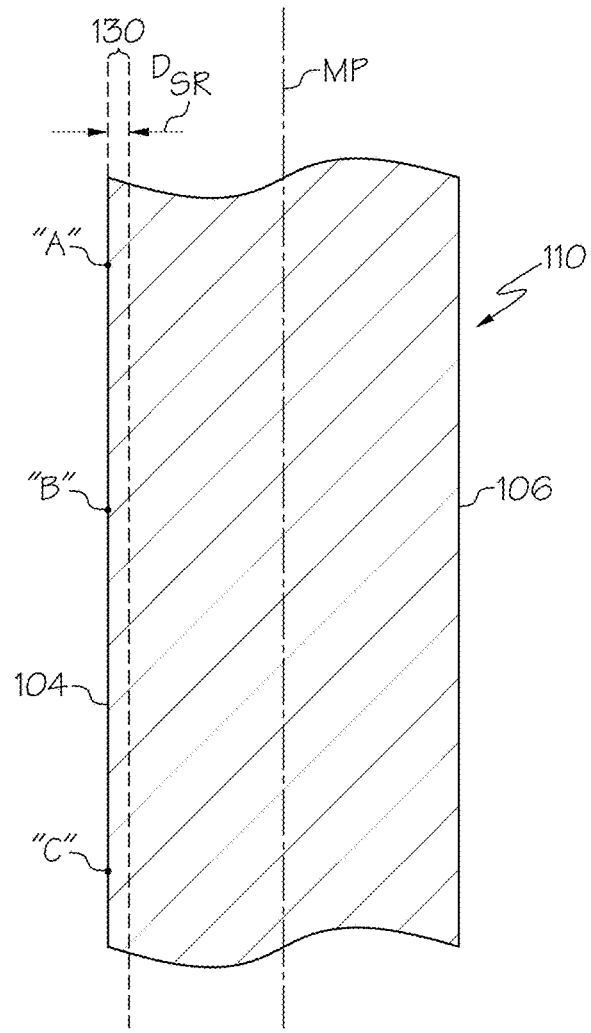
FIG. 4 schematically depicts a portion of a sidewall of a glass container having a persistent surface homogeneity.

In embodiments described herein, the phrase "persistent surface homogeneity" means that the concentration of the constituent components (e.g., $SiO_2$, $Al_2O_3$, $Na_2O$, etc.) of the glass composition at a discrete point in the surface region do not vary from the concentration of the same constituent components at any second discrete point in the surface region by an amount which would result in delamination of the body upon long term exposure to a solution contained within the container. For example, as shown in FIG. 4, a partial cross-section of a wall portion 110 of the glass container 100 is depicted. The body 102 of the glass container 100 has a surface region 130 which extends over the inner surface 104 of the glass container 100. In some embodiments, the surface region 130 may extend into the wall thickness $T_w$ of the wall portion 110 to a depth $D_{SR}$ from the inner surface 104 of the glass container. The surface region 130 extends to a shallower depth than the interior region 120. The glass composition of the inner surface 104 and the surface region 130 has a persistent surface homogeneity which, in conjunction with the depth $D_{SR}$ of the surface region, is sufficient to prevent delamination of the body following long term exposure to a solution contained in the interior volume of the glass container. The homogeneity of the surface concentration of the glass constituent components in the surface region is generally an indication of the propensity of the glass composition to de-laminate and shed glass particles from the inner surface 104 of the glass container 100. When the glass composition has a persistent surface homogeneity in the surface region (i.e., when the extrema of the surface concentration of the glass constituent components in the surface region at a discrete point A on the inner surface 104 are within +/−30% of the same constituent components in the surface region at any second discrete point B or C on the inner surface 104), the glass composition has improved resistance to delamination.

Glass containers having persistent layer homogeneity and/or persistent surface homogeneity may be achieved using various techniques, including, but not limited to, acid etching at least the inner surface 104 of the body 102 of the glass container 100 or by forming the glass container from glass compositions in which the constituent components of the glass composition form species with relatively low vapor pressures (i.e., species with a low volatility) at the temperatures required to reform the glass containers from glass stock into the desired container shape. Because these constituent components form species with relatively low vapor pressures at the reforming temperatures, the constituent components are less likely to volatilize and evaporate from the surfaces of the glass, thereby forming a glass container with a compositionally homogenous surface over the inner surface of the glass container and through the thickness of the glass container.

Certain species of the constituent components of the glass composition may be volatile at the glass forming and reforming temperatures which, in turn, may lead to compositional heterogeneities and subsequent delamination. Forming and reforming temperatures of the glass composition generally correspond to the temperatures at which the glass composition has a viscosity in the range from about 200 poise to about 20 kilopoise or from about 1 kilopoise to about 10 kilopoise. Accordingly, in some embodiments, the glass compositions from which the glass containers are formed are free from constituent components which form species that volatilize at temperatures corresponding to a viscosity in the range from about 200 poise to about 100 kilopoise. In some embodiments, the glass compositions are free from constituent components which form species that volatilize at temperatures corresponding to a viscosity in the range from about 200 poise to about 50 kilopoise. In some other embodiments, the glass compositions are free from constituent components which form species that volatilize at temperatures corresponding to a viscosity in the range from about 1 kilopoise to about 10 kilopoise.

In some embodiments described herein, the glass containers are formed from alkali aluminosilicate glass compositions or alkaline-earth aluminosilicate glass compositions. Additionally, in various embodiments described herein, the boron concentration in the glass compositions from which the glass containers are formed is limited to mitigate both delamination and phase separation. Boron-containing species in the glass are highly volatile at the elevated temperatures used for glass forming and reforming, which leads to delamination of the resultant glass container. In various embodiments described herein, the glass compositions include less than or equal to 0.3 mol. % of oxides of boron and/or compounds containing boron, including, without limitation, $B_2O_3$. In some of these embodiments, the concentration of oxides of boron and/or compounds containing boron in the glass composition may be less than or equal to 0.2 mol. % or even less than or equal to 0.1 mol. %. In some other embodiments, the glass compositions are substantially free from boron and compounds containing boron.

Phosphorous, zinc, lead, bismuth, chlorine, fluorine, and oxides of tin, like boron, generally form species in the glass composition which are highly volatile at the elevated temperatures used for glass forming and reforming. As such, these constituent components can lead to compositional heterogeneities in the finished glass container which, in turn, may lead to delamination. Accordingly, in some embodiments described herein, the concentration of phosphorous, zinc, lead, bismuth, chlorine, fluorine, oxides of tin, and compounds containing phosphorous, zinc, lead, bismuth, chlorine, fluorine, and oxides of tin (such as $P_2O_5$, ZnO, and the like) is limited to mitigate delamination. In some embodiments, the glass compositions from which the glass containers are made include less than or equal to 0.5 mol. %, less than or equal to 0.3 mol. %, less than or equal to 0.2 mol. %, or even less than or equal to 0.1 mol. % of phosphorous, zinc, lead, bismuth, chlorine, fluorine, oxides of tin, and compounds containing phosphorous, zinc, lead, bismuth, chlorine, fluorine, or oxides of tin. In some other embodiments, the glass compositions are substantially free from one or more of phosphorous, zinc, lead, bismuth, chlorine, fluorine, oxides of tin, and compounds containing phosphorous, zinc, lead, bismuth, chlorine, fluorine, and oxides of tin.

In one exemplary embodiment, the glass containers are formed from a delamination resistant glass composition such as the alkaline earth aluminosilicate glass compositions described in U.S. Pat. No. 9,145,329, filed Oct. 25, 2012 and entitled "Alkaline Earth Alumino-Silicate Glass Compositions with Improved Chemical and Mechanical Durability," or U.S. Pat. No. 8,551,898, filed Apr. 25, 2013 and entitled "Glass Compositions with Improved Chemical and Mechanical Durability," the entirety of each of which is incorporated herein by reference. These exemplary glass compositions generally include a combination of $SiO_2$, $Al_2O_3$, at least one alkaline earth oxide, and at least two alkali oxides including at least $Na_2O$ and $K_2O$. In some embodiments, the glass compositions may also be free from boron and compounds containing boron. The combination of these components enables a glass composition which is resistant to chemical degradation and is also suitable for chemical strengthening by ion exchange. In some embodiments, the glass compositions may further include minor amounts of one or more additional oxides, such as, by way of example and not limitation, $SnO_2$, $ZrO_2$, ZnO, or the like. These components may be added as fining agents and/or to further enhance the chemical durability of the glass composition.

In various embodiments of the first exemplary glass composition, the glass composition generally includes $SiO_2$ in an amount greater than or equal to about 65 mol. % and less than or equal to about 75 mol. %. In some embodiments, $SiO_2$ is present in the glass composition in an amount greater than or equal to about 67 mol. % and less than or equal to about 75 mol. %. In some other embodiments, $SiO_2$ is present in amount greater than or equal to about 67 mol. % and less than or equal to about 73 mol. %. In each of these embodiments, the amount of $SiO_2$ may be greater than or equal to about 70 mol. % or even greater than or equal to about 72 mol. %.

The first exemplary glass composition also includes $Al_2O_3$. $Al_2O_3$, in conjunction with alkali oxides present in the glass composition, such as $Na_2O$ or the like, improves the susceptibility of the glass to ion exchange strengthening. Moreover, additions of $Al_2O_3$ to the composition reduce the propensity of alkali constituents (such as Na and K) from leaching out of the glass and, as such, increase the resistance of the composition to hydrolytic degradation. Moreover, additions of $Al_2O_3$ greater than about 12.5 mol. % may also increase the softening point of the glass, thereby reducing the formability of the glass. Accordingly, various glass compositions described herein include $Al_2O_3$ in an amount greater than or equal to about 6 mol. % and less than or equal to about 12.5 mol. %. In some embodiments, the amount of $Al_2O_3$ in the glass composition is greater than or equal to about 6 mol. % and less than or equal to about 10 mol. %. In some other embodiments, the amount of $Al_2O_3$ in the glass composition is greater than or equal to about 7 mol. % and less than or equal to about 10 mol. %.

Various embodiments of the first exemplary glass composition further include at least two alkali oxides. The alkali oxides facilitate the ion exchangeability of the glass composition, thus facilitating chemical strengthening of the glass and lower the softening point of the glass, thereby offsetting the increase in the softening point due to higher concentrations of $SiO_2$ in the glass composition. The alkali oxides also assist in improving the chemical durability of the glass composition. The alkali oxides are generally present in the glass composition in an amount greater than or equal to about 5 mol. % and less than or equal to about 12 mol. %. In some embodiments, the amount of alkali oxides may be greater than or equal to about 5 mol. % and less than or equal to about 10 mol. %. In some other embodiments, the amount of alkali oxides may be greater than or equal to about 5 mol. % and less than or equal to about 8 mol. %. In all of the glass compositions described herein, the alkali oxides include at least $Na_2O$ and $K_2O$. Some embodiments further include $Li_2O$.

The ion exchangeability of the glass composition is primarily imparted to the glass composition by the amount of $Na_2O$ initially present in the glass composition prior to ion exchange. Specifically, in order to achieve the desired compressive stress and depth of layer in the glass composition upon ion exchange strengthening, various embodiments of the glass compositions include $Na_2O$ in an amount greater than or equal to about 2.5 mol. % and less than or equal to about 10 mol. % based on the molecular weight of the glass composition. In some embodiments, the glass composition includes $Na_2O$ in an amount greater than or equal to about 3.5 mol. % and less than or equal to about 8 mol. % or even greater than or equal to about 6 mol. % and less than or equal to about 8 mol. %.

The amount of $K_2O$ also relates to the ion exchangeability of the glass composition. In particular, as the amount of $K_2O$ present in the glass composition increases, the compressive stress obtainable through ion exchange decreases. Accordingly, in some embodiments, the amount of $K_2O$ is greater than 0 mol. % and less than or equal to about 2.5 mol. % based on the molecular weight of the glass composition. In some of these embodiments, the amount of $K_2O$ present in the glass composition is greater than 0 mol. % and less than or equal to about 0.5 mol. %.

In embodiments including $Li_2O$, the $Li_2O$ may be present in an amount greater than or equal to about 1 mol. % and less than or equal to about 3 mol. % based on the molecular weight of the glass composition. In some embodiments, $Li_2O$ may be present in the glass composition in an amount greater than about 2 mol. % and less than or equal to about 3 mol. %. However, as provided hereinabove, in some embodiments, the glass composition may be substantially free of lithium and compounds containing lithium.

As provided hereinabove, the first exemplary glass composition includes at least one alkaline earth oxide. Alkaline earth oxides improve the meltability of the glass batch materials and increase the chemical durability of the glass composition, in addition to reducing the susceptibility of the glass to delamination. In the glass compositions described herein, the glass compositions generally include at least one alkaline earth oxide in a concentration greater than or equal to about 8 mol. % or even 8.5 mol. % and less than or equal to about 15 mol. %. In some embodiments, the glass composition includes from about 9 mol. % to about 15 mol. % of alkaline earth oxide or from about 10 mol. % to about 14 mol. %.

The alkaline earth oxide may include, for example, MgO, CaO, SrO, BaO, or combinations thereof. For example, MgO may be present in the glass composition in an amount which is greater than or equal to about 2 mol. % and less than or equal to about 7 mol. % based on the molecular weight of the glass composition, or even greater than about 3 mol. % and less than or equal to about 5 mol. %.

As another example, CaO may be present in the glass composition in an amount from about 2 mol. % to less than or equal to 7 mol. % based on the molecular weight of the glass composition, from about 3 mol. % to less than or equal to 7 mol. %, from greater than or equal to about 4 mol. % to less than or equal to about 7 mol. %, or even from greater than or equal to about 5 mol. % to less than or equal to about 6 mol. %. In still other embodiments, CaO may be present in an amount greater than or equal to about 2 mol. % and less than or equal to about 5 mol. %.

In some embodiments, SrO may be included in the glass composition in an amount greater than 0 mol. % and less than or equal to about 6 mol. %, greater than 0 mol. % and less than or equal to about 5 mol. %, greater than or equal to about 2 mol. % and less than or equal to about 4 mol. %, or even from about 1 mol. % to about 2 mol. %. In still other embodiments, SrO may be present in the glass composition in an amount greater than or equal to about 3 mol. % and less than or equal to about 6 mol. %.

In embodiments including BaO, the BaO may be present in an amount greater than about 0 mol. % and less than about 2 mol. %. In some of these embodiments, BaO may be present in the glass composition in an amount less than or equal to about 1.5 mol. % or even less than or equal to about 0.5 mol. %.

In addition to the $SiO_2$, $Al_2O_3$, alkali oxides and alkaline earth oxides, the first exemplary glass compositions described herein may optionally include one or more fining agents, such as, by way of example and not limitation, $SnO_2$, $As_2O_3$, and/or $Cl^-$ (from NaCl or the like). When a fining agent is present in the glass composition, the fining agent may be present in amount less than or equal to about 1 mol. % or even less than or equal to about 0.5 mol. %. For example, in a particular embodiment, $SnO_2$ is included as a fining agent in an amount greater than about 0 mol. % and less than or equal to about 0.3 mol. %.

Additional metal oxides may additionally be included in the glass compositions of various embodiments. For example, the glass composition may further include ZnO or $ZrO_2$, each of which improves the resistance of the glass composition to chemical attack. In such embodiments, the additional metal oxide may be present in an amount which is greater than or equal to about 0 mol. % and less than or equal to about 2.0 mol. %. For example, the glass composition may include $ZrO_2$ in an amount less than or equal to about 1.5 mol. %. Alternatively or additionally, ZnO may be included in an amount of less than or equal to about 2.0 mol. %. In some embodiments, ZnO may be included as a substitute for one or more of the alkaline earth oxides, such as a partial substitute for MgO or in addition to or in place of at least one of CaO or SrO.

In one embodiment, the first exemplary glass composition may include from about 65 mol. % to about 75 mol. % $SiO_2$; from about 6 mol. % to about 12.5 mol. % $Al_2O_3$; and from about 5 mol. % to about 12 mol. % alkali oxide, where the alkali oxide includes $Na_2O$ and $K_2O$. The $K_2O$ may be present in an amount less than or equal to 0.5 mol. %. The glass composition may also include from about 8.0 mol. % to about 15 mol. % of alkaline earth oxide.

In another embodiment, the first exemplary glass composition includes from about 67 mol. % to about 75 mol. % $SiO_2$; from about 6 mol. % to about 10 mol. % $Al_2O_3$; from about 5 mol. % to about 12 mol. % alkali oxide; and from about 9 mol. % to about 15 mol. % alkaline earth oxide. The alkali oxide includes at least $Na_2O$ and $K_2O$. The $K_2O$ may be present in an amount less than or equal to 0.5 mol. %. The glass composition is free from boron and compounds of boron.

In yet another embodiment, the first exemplary glass composition includes from about 67 mol. % to about 75 mol. % $SiO_2$; from about 6 mol. % to about 10 mol. % $Al_2O_3$; from about 5 mol. % to about 12 mol. % alkali oxide; and from about 9 mol. % to about 15 mol. % of alkaline earth oxide. The alkaline earth oxide includes at least one of SrO and BaO. The glass composition is free from boron and compounds containing boron.

In a second exemplary embodiment, the glass containers are formed from an alkali aluminosilicate glass composition which includes a combination of $SiO_2$, $Al_2O_3$, at least one alkaline earth oxide, and one or more alkali oxides, such as $Na_2O$ and/or $K_2O$. The glass composition comprises less than or equal to 0.3 mol. % of boron and compounds containing boron and less than or equal to 0.5 mol. % of ZnO and compounds containing ZnO.

Generally, this second exemplary glass composition includes $SiO_2$ in an amount greater than or equal to 67 mol. % and less than or equal to about 74.5 mol. %. $Al_2O_3$ may be present in various embodiments of the second exemplary glass composition in amounts greater than or equal to about 6.5 mol. % and less than or equal to about 10.5 mol. %. In embodiments including $Na_2O$, the $Na_2O$ may be present in an amount of from about 0 mol. % to about 8 mol. % or from greater than or equal to about 0.1 mol. % to less than or equal to about 8 mol. %. When $K_2O$ is present, $K_2O$ may be included in an amount greater than or equal to 0 mol. % and less than or equal to 1.5 mol. %.

The alkaline earth oxides present in the second exemplary glass composition may include at least MgO and CaO. For example, in embodiments of the second exemplary glass composition, the alkaline earth oxide includes MgO. MgO is present in an amount greater than or equal to about 4.5 mol. % and less than or equal to about 12.5 mol. %. CaO may be present in an amount from about 4.4 mol. % to less than or equal to 13.5 mol. %.

In various embodiments of the second exemplary glass composition, ZnO is present in a concentration of greater than or equal to 0 mol. % and less than or equal to 0.5 mol. %. In some embodiments, the concentration of ZnO is greater than or equal to 0 mol. % and less than or equal to 0.3 mol. %, greater than or equal to 0 mol. % and less than or equal to 0.2 mol. %, or even greater than or equal to 0 mol. % and less than or equal to 0.1 mol. %. In some embodiments, the glass compositions are substantially free from ZnO.

Some embodiments of the second exemplary glass composition further include $B_2O_3$ in a concentration of greater than or equal to 0 mol. % and less than or equal to 0.3 mol. %. In some embodiments, the concentration of $B_2O_3$ is greater than or equal to 0 mol. % and less than or equal to 0.2 mol. %, or even greater than or equal to 0 mol. % and less than or equal to 0.1 mol. %. In some embodiments, the glass compositions are substantially free from $B_2O_3$.

Some embodiments of the second exemplary glass composition further include minor amounts of one or more additional oxides, such as, by way of example and not limitation, $SnO_2$, $ZrO_2$, $TiO_2$, $As_2O_3$, or the like. These components may be added as fining agents and/or to further enhance the chemical durability of the glass composition.

In one embodiment, the second exemplary glass composition includes from about 67 mol. % to about 74.5 mol. % $SiO_2$; from about 6.5 mol. % to about 10.5 mol. % $Al_2O_3$; from about 0 mol. % to about 8 mol. % $Na_2O$; from about 0 mol. % to about 1.5 mol. % $K_2O$; from about 4.5 mol. % to about 12.5 mol. % MgO; from about 4.4 mol. % to about 13.5 mol. % CaO; from about 0 mol. % to about 0.5 mol. % ZnO; and from about 0 mol. % to about 0.3 mol. % $B_2O_3$.

In some other embodiments, the glass containers are formed from glass compositions which are substantially free from alkali oxides. For example, in some embodiments, the glass compositions may be formed from glass compositions with a high silica concentration (i.e., greater than or equal to about 75 mol. %) which is fluxed with rare earth oxides (such as $Y_2O_3$, $La_2O_3$, $Ga_2O_3$, $GeO_2$), $Al_2O_3$, $TiO_2$, and/or $ZrO_2$ rather than boron, alkali oxides, or alkaline earth oxides. The rare earth oxides reduce the melting temperature of silica but do not adversely impact the hydrolytic resistance of the glass in the same manner as soda lime silicates or alkali borosilicates do. Moreover, such glasses generally remain homogenous on reforming as they do not contain volatile species and, accordingly, will not experience changes in surface chemistry and delamination.

Further, in some embodiments, the glass container 100 may be formed from glass compositions that are chemically durable and resistant to degradation as determined by the DIN 12116 standard, the ISO 695 standard, the ISO 719 standard, and the ISO 720 standard.

Specifically, the DIN 12116 standard is a measure of the resistance of the glass to decomposition when placed in an acidic solution. The DIN 12116 standard is broken into individual classes. Class S1 indicates weight losses of up to 0.7 mg/dm$^2$; Class S2 indicates weight losses from 0.7 mg/dm$^2$ up to 1.5 mg/dm$^2$; Class S3 indicates weight losses from 1.5 mg/dm$^2$ up to 15 mg/dm$^2$; and Class S4 indicates weight losses of more than 15 mg/dm$^2$. In various embodiments, the glass composition from which the glass container is formed has an acid resistance of class S3 or better according to DIN 12116 with some embodiments having an acid resistance of at least class S2 or better or even class S1.

It should be understood that lower class rankings have improved acid resistance performance. Accordingly, a composition graded at S1 has better acid resistance than a composition graded at class S2.

The ISO 695 standard is a measure of the resistance of the glass to decomposition when placed in a basic solution. The ISO 695 standard is broken into individual classes. Class A1 indicates weight losses of up to 75 mg/dm$^2$; Class A2 indicates weight losses from 75 mg/dm$^2$ up to 175 mg/dm$^2$; and Class A3 indicates weight losses of more than 175 mg/dm$^2$. In various embodiments, the glass composition from which the glass container is formed has a base resistance according to ISO 695 of class A2 or better with some embodiments having a class A1 base resistance. It should be understood that lower class rankings have improved base resistance performance. Accordingly, a composition graded at class A1 has better base resistance than a composition graded at class A2.

In various embodiments, the glass compositions from which the glass containers are formed are chemically durable and resistant to degradation as determined by the ISO 720 standard. The ISO 720 standard is a measure of the resistance of the glass to degradation in distilled water (i.e., the hydrolytic resistance of the glass). The ISO 720 standard is broken into individual types. Type HGA1 is indicative of up to 62 μg extracted equivalent of Na$_2$O; Type HGA2 is indicative of more than 62 μg and up to 527 μg extracted equivalent of Na$_2$O; and Type HGA3 is indicative of more than 527 μg and up to 930 μg extracted equivalent of Na$_2$O. In various embodiments, the glass composition from which the glass container is formed has an ISO 720 hydrolytic resistance of type HGA2 or better with some embodiments having a type HGA1 hydrolytic resistance or better. It should be understood that lower class rankings have improved hydrolytic resistance performance. Accordingly, a composition graded at HGA1 has better hydrolytic resistance than a composition graded at HGA2.

In various embodiments, the glass compositions from which the glass containers are formed are chemically durable and resistant to degradation as determined by the ISO 719 standard. The ISO 719 standard is a measure of the resistance of the glass to degradation in distilled water (i.e., the hydrolytic resistance of the glass). The ISO 719 standard is broken into individual types. Type HGB1 is indicative of up to 31 μg extracted equivalent of Na$_2$O; Type HGB2 is indicative of more than 31 μg and up to 62 μg extracted equivalent of Na$_2$O; Type HGB3 is indicative of more than 62 μg and up to 264 μg extracted equivalent of Na$_2$O; Type HGB4 is indicative of more than 264 μg and up to 620 μg extracted equivalent of Na$_2$O; and Type HGB5 is indicative of more than 620 μg and up to 1085 μg extracted equivalent of Na$_2$O. In various embodiments, the glass composition from which the glass container is formed has an ISO 719 hydrolytic resistance of type HGB2 or better with some embodiments having a type HGB1 hydrolytic resistance or better. It should be understood that lower class rankings have improved hydrolytic resistance performance. Accordingly, a composition graded at HGB1 has better hydrolytic resistance than a composition graded at HGB2.

It should be understood that, when referring to the above-referenced classifications according to ISO 719, ISO 720, ISO 605, and DIN 12116, a glass composition or glass article which has a specified classification "or better" means that the performance of the glass composition is as good as or better than the specified classification. For example, a glass article which has an ISO 719 hydrolytic resistance of "HGB2" or better may have an ISO 719 classification of either HGB2 or HGB1.

Figure 5:
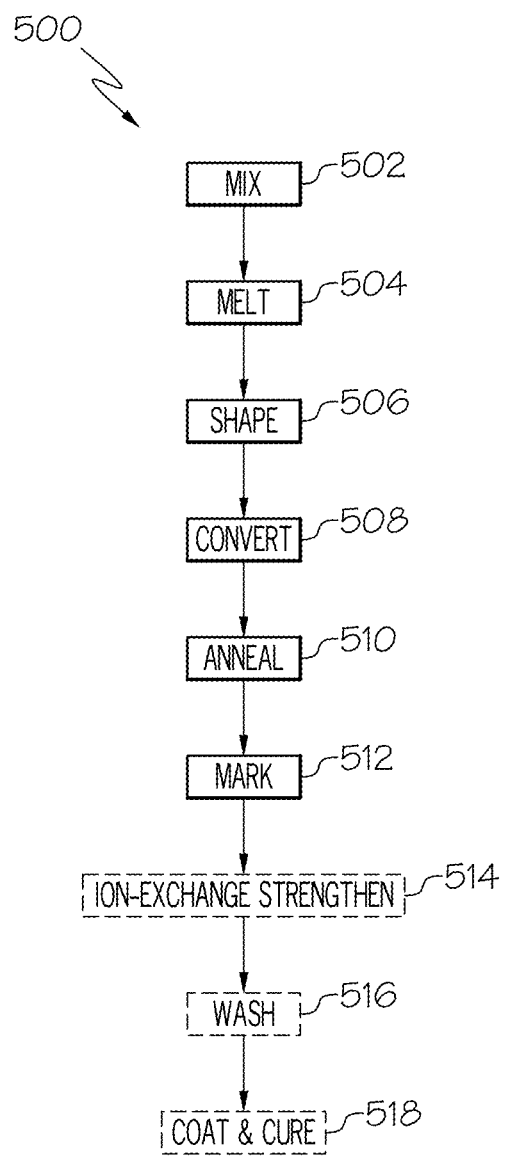
FIG. 5 schematically depicts a process for forming a glass container in accordance with one or more embodiments described herein.

FIG. 5 depicts an exemplary method 500 of forming a glass container according to various embodiments described herein. As depicted in FIG. 5, the glass compositions described herein are formed by mixing a batch of glass raw materials (e.g., powders of SiO$_2$, Al$_2$O$_3$, alkali oxides, alkaline earth oxides, and the like) such that the batch of glass raw materials has the desired composition (502). Thereafter, the batch of glass raw materials is heated (504) to form a molten glass composition which is subsequently cooled and solidified to form the glass composition. During solidification (i.e., when the glass composition is plastically deformable), the glass composition may be shaped (506) into a stock form, such as a sheet, tube or the like, and subsequently converted (e.g., reheated and formed) into the glass container 100 (508). However, given the chemical durability of the glass compositions, the glass compositions described herein are particularly well suited for use in the formation of pharmaceutical packages for containing a pharmaceutical formulation, such as liquids, powders, and the like. For example, the glass containers may be in the form of vials, ampoules, cartridges, syringe bodies, and/or any other glass container for storing pharmaceutical formulations.

After conversion into the glass container 100, the glass container 100 is annealed (510). Then, the glass container 100 is marked (512). As will be described in greater detail hereinbelow, in various embodiments, an anti-counterfeit marking is formed in a glass container by focusing a pulsed laser beam at a point within a wall thickness of the body of the glass container and translating the pulsed laser beam along a scan path within the wall thickness effective to induce a change in the refractive index of the glass along the scan path relative to the refractive index of the portion of the body unexposed to the pulsed laser beam.

Next, in some embodiments, after the glass container is marked, the glass container 100 may then be ion-exchange strengthened (514), washed (516), and/or coated and cured (518). For example, the glass container may be submerged in a molten salt bath of KNO$_3$ or a mixture of KNO$_3$ and NaNO$_3$ to ion-exchange strengthen the glass container, may be acid washed to ensure persistent layer homogeneity and/or persistent surface homogeneity, and/or may be coated with a coating to provide or enhance delamination resistance and/or damage resistance.

In some embodiments, the glass container is coated on at least a portion of the outer surface 106 with a low-friction coating that may include a polymer chemical composition and a coupling agent. In embodiments, the polymer and the coupling agent may be mixed and applied in a single coating layer on the glass container, or the polymer and the coupling agent may be layered. For example, the polymer layer may be positioned over the coupling agent layer such that the polymer layer is an outer layer relative to the coupling agent layer and the glass wall.

Additional details on suitable coatings, including polyimide-based coatings, may be found in U.S. Patent Application Publication No. 2013/0171456, filed Feb. 28, 2013, and entitled "Glass Articles with Low-Friction Coatings," U.S. Patent Application Publication No. 2013/0224407, filed Feb. 28, 2013, and entitled "Glass Articles with Low-Friction Coatings," U.S. Patent Application Publication No. 2014/0001076, filed Mar. 14, 2013, and entitled "Delamination Resistant Glass Containers with Heat-Tolerant Coatings," U.S. Patent Application Publication No. 2014/0001143, filed Jun. 28, 2013, and entitled "Delamination Resistant Glass Containers with Heat-Tolerant Coatings," U.S. Patent Application Publication No. 2014/0151320, filed Nov. 8, 2013, and entitled "Glass Containers with Delamination Resistance and Improved Damage Tolerance," U.S. Patent Application Publication No. 2014/0151321, filed Nov. 8, 2013, and entitled "Glass Containers with Improved Strength and Improved Damage Tolerance," U.S. Patent Application Publication No. 2014/0151370, filed Nov. 8, 2013, and entitled "Strengthened Glass Containers Resistant to Delamination and Damage," U.S. Patent Application Publication No. 2015/0329416, filed Jul. 29, 2015, and entitled "Glass Articles with Low-Friction Coatings," U.S. Patent Application Publication No. 2015/0360999, filed Jul. 29, 2015, and entitled "Glass Articles with Low-Friction Coatings," U.S. Pat. No. 9,034,442, filed Oct. 11, 2013, and entitled "Strengthened Borosilicate Glass Containers with Improved Damage Tolerance," and U.S. Pat. No. 9,428,302, filed Oct. 18, 2013, and entitled "Delamination Resistant Glass Containers with Heat-Tolerant Coatings," each of which are hereby incorporated by reference in its entirety.

Although FIG. 5 depicts the marking (512) of the glass as occurring after the annealing step (510), it should be understood that the anti-counterfeit marking may be formed within the glass at any suitable time during the glass container forming process, depending on the embodiment. For example, in embodiments in which the glass container is ion-exchange strengthened, the marking may be formed within the wall thickness prior to or subsequent to the ion-exchange strengthening of the glass container (e.g., before or after step 514 in the method 500 depicted in FIG. 5). In other words, the glass may be ion-strengthened prior to forming the anti-counterfeit marking in the glass container or subsequent to forming the anti-counterfeit marking in the glass container.

Moreover, in some embodiments, the anti-counterfeit marking may be formed within the wall thickness before the glass container itself is formed. For example, the anti-counterfeit marking may be formed between steps 506 and 508 in method 500. Alternatively, the anti-counterfeit marking may be formed after conversion of the glass into the glass container but before annealing (e.g., between steps 508 and 510 in method 500).

As described hereinabove, in various embodiments, the glass container 100 has chemical durability properties and resistance to degradation that make it particularly well suited for use in the formation of pharmaceutical packages. Accordingly, in various embodiments, the inclusion of the marking 116 within the wall thickness $T_w$ minimally affects the product strength and results in negligible damage to the surface of the glass container 100. Without being bound by theory, it is believed that including the marking 116 within the wall thickness $T_w$ does not significantly affect the strength of the glass container 100 because in bending, the center portion of the wall thickness $T_w$ is a neutral axis with effectively zero tensile stress. This is in contrast to markings positioned towards the surface (in a compressively stressed layer of the glass), which has increased stresses thus increasing the influence of the marking on strength reduction. In order to introduce the marking 116 with minimal affect to product strength or damage the surface of the glass container 100, in various embodiments, the marking 116 may include one or more photonic microstructures resulting from a change in the refractive index in the marked portion of the body 102. The marking 116 may be produced using a femtosecond or UV laser, for example.

In various embodiments, the marking 116 may be produced as a diffraction grating having periodic changes in the refractive index of the glass resulting from exposure to a femtosecond laser. In particular, the laser energy may result in localized density changes within the material which, in turn, cause a change in the refractive index of the glass. The period change in the refractive index may result in different diffraction angles of light of different wavelengths. In some embodiments, these diffraction gratings can be visible to the naked eye, visible with an optical lighting setup, or visible with specially-designed equipment. In some embodiments, the shape of the marking 116 may form a manufacturer identifier while the resonant frequency of the marking 116 may be used to individually identify parts or lots.

In other embodiments, the marking 116 may include a pattern of microstructures. The pattern may be used to uniquely identify a manufacturer, product, or lot. In some of these embodiments, the pattern of the marking 116 may be illuminated by optically aligning a light source with the pattern. Optical alignment of the light source with the pattern may result in the marking 116 becoming visibly detectable.

Figure 6:
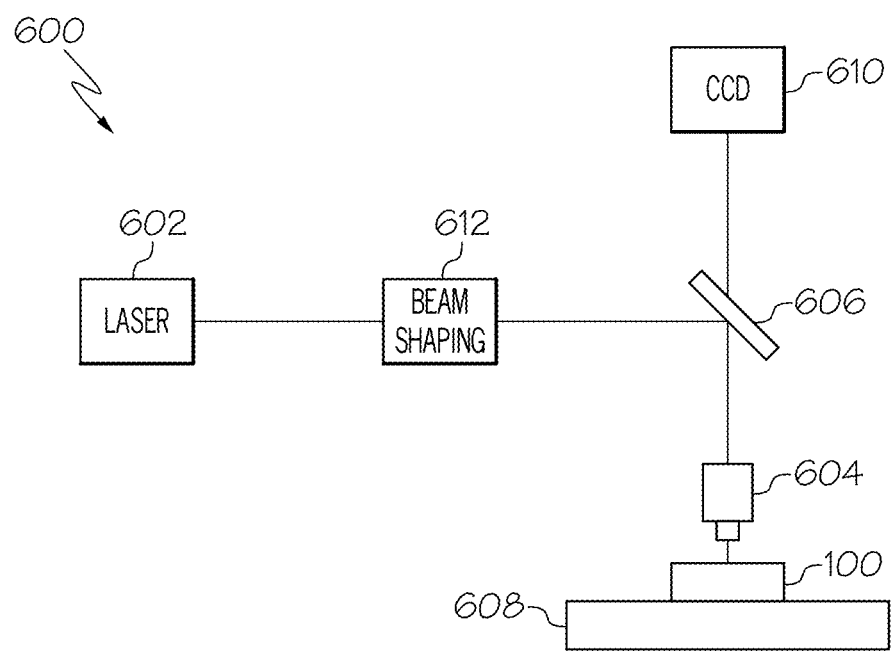
FIG. 6 schematically depicts a laser writing system for generating a marking in accordance with one or more embodiments described herein.

Regardless of the form of the marking 116, in various embodiments, the marking 116 is the result of exposure of the glass container 100 with a laser writing system, such as the laser writing system 600 depicted in FIG. 6. In one embodiment, the laser writing system 600 employs a femtosecond laser 602 which provides a femtosecond pulsed beam which is focused into the wall thickness $T_w$ of the glass container 100 through a microscope objective 604. The generating of the marking 116 within the wall thickness $T_w$ is a function of the intensity dependence of the interaction that leads to the optical change. Specifically, if the dependence on the intensity is of the form $I^m$, m being the order of the process, then it is possible to have the interaction occur only at the focus of the beam. This is the case because intensity in the entrance cone up to the focal point is too weak to effect the interaction. The larger the value of m, the more this will be so and the smaller the spot will be for a given focusing lens. The maximum depth to which one can write is ultimately limited by the working distance of the writing lens, consistent with the writing intensity.

In various embodiments, the intensity of the interaction leads to a refractive index change at the focal point through a two-photon absorption process. Specifically, when the laser beam is pulsed, photons from the laser beam are absorbed by the glass at the focal point of the laser beam. As a result of the absorption of the photons by the glass, a refractive index change in the glass is generated. While the mechanism of the interaction of the glass with the femtosecond-laser is not clear, it is believed that because of the shortness of the pulse duration, the excited photo-electrons cannot thermally relax since the pulse duration is shorter than the lattice thermalization time. With high enough intensities and the inability for the electrons to relax, one can build up a relatively high electron density. It is sufficiently high to be considered a plasma. How the structure is permanently changed as a result of this is not known. It is possible that it is related to a densification similar to what has been reported as occurring in materials after high energy excitation such as gamma-rays or UV-excimer laser.

The exposure energy required to induce a measurable refractive index change can vary by orders of magnitude depending on the specific glass composition. It has been found that a significant factor influencing the interaction is the excitation wavelength of the femtosecond-source ($\lambda_{ex}$) relative to the intrinsic absorption of the glass ($\lambda_g$). If the excitation wavelength is within two-photon excitation range of the intrinsic absorption edge, as set out in the above formula then it has been practical to induce index change of the order of $10^{-4}$ or $10^{-3}$ with pulse energy less than 10 nJ, for example as low as 1 nJ. This is in contrast to the energy (which can be 1000 times larger) required to produce a comparable index change when the excitation wavelength is far from the intrinsic absorption edge.

In various embodiments, the femtosecond laser 602 is operated such that the laser pulse width is less than about 500 ps. In some embodiments, the laser pulse width is less than about 400 ps, less than about 300 ps, less than about 200 ps, less than about 100 ps, less than about 50 ps, or even less than about 30 ps. The laser pulse width may be greater than about 0.001 ps, greater than about 0.01 ps, greater than about 0.1 ps, greater than about 1 ps, greater than about 5 ps, greater than about 10 ps, or even greater than about 20 ps. In particular embodiments, the laser pulse width may be from about 0.001 ps to about 500 ps, from about 1 ps to about 450 ps, from about 5 ps to about 400 ps, from about 10 ps to about 300 ps, from about 20 ps to about 200 ps, or from about 30 ps to about 100 ps. In embodiments, the laser pulse width may be from about 10 fs to about 1,000 fs or from about 100 fs to about 300 fs.

The repetition rate of laser pulses may be from about 50 kHz to about 1,000 kHz (i.e., from about 0.05 MHz to about 1 MHz). In some embodiments, the repetition rate of laser pulses is from about 50 kHz to about 500 kHz (i.e., from about 0.05 MHz to about 0.5 MHz) or from about 100 kHz to about 500 kHz (i.e., from about 0.1 MHz to about 0.5 MHz).

The femtosecond laser may have a wavelength from about 515 nm to about 1030 nm, from about 700 nm to about 1600 nm, from about 800 nm to about 1550 nm, or even from about 1030 nm to about 1060 nm, depending on the particular embodiment. In some embodiments, the femtosecond laser has a wavelength from about 515 nm to about 1600 nm or from about 900 nm to about 1600 nm. However, it is contemplated that other wavelengths, and other laser types, may be employed. For example, in embodiments employing a femtosecond Ti-Sapphire laser, the femtosecond laser may have a wavelength of from about 400 nm to about 1600 nm or from about 450 nm to about 1600 nm, or second harmonics thereof.

In various embodiments, the pulse energy of the femtosecond laser may be from about 1,000 nJ to about 5,000 nJ, from about 1,500 nJ to about 4,500 nJ, or even from about 2,000 nJ to about 4,000 nJ. The femtosecond laser may have a power of from about 200 mW to about 8,000 mW, from about 500 mW to about 4,000 mW, or from about 1,000 mW to about 1,500 mW.

In the embodiment depicted in FIG. 6, residual light outside of the desired wavelength is filtered out of the system by a filter 606, such as a dichroic mirror (e.g., a beam splitter). The filter 606 may selectively split the laser beam into a portion to be focused within the thickness of a wall of the glass container 100 and a portion to be reflected. In embodiments, the laser beam may be focused into a spot size of from about 0.5 µm to about 40 µm, from about 1 µm to about 20 µm, from about 1 µm to about 10 µm, or from about 1 µm to about 2 µm, depending on the particular embodiment. It should be understood that the spot size employed may vary depending on the translation speed and other laser parameters.

In FIG. 6, the glass container 100 is positioned on a motion stage 608. The motion stage 608 effects translation of the glass container 100 relative to the laser beam at a desired translation or scan speed and enables the location of the focal point of the laser beam to be changed within the wall thickness $T_w$ of the glass container 100. In various embodiments, the motion stage 608 is a computer controlled XYZ stage configured to translate the glass container 100 in one or more of the x-direction, the y-direction, and the z-direction. The high intensity of the focused laser beam effects an increase in the refractive index of the glass along the path traced by the focused beam as it is translated through the glass container 100. The resulting region of increased refractive index forms a pattern, for example, that can guide light and therefore can function as an optical waveguide or marking 116. In various embodiments, the refractive index of the marking 116 differs from the refractive index of the unmarked portion of the body 102 by from about 0.2% to about 5%, or from about 0.2% to about 0.8%. In particular embodiments, the refractive index of the marking 116 differs from the refractive index of the unmarked portion of the body 102 by from about 0.3% to about 0.5% or from about 1% to about 5%. Without being bound by theory, a difference in the refractive indices of the marking and the unmarked portion of the body 102 of greater than about 0.5% may be visible to the naked eye, resulting in an overt marking, and a difference in the refractive indices of the marking and the unmarked portion of the body 102 of less than about 0.5% may be invisible to the naked eye, resulting in a covert marking. In some embodiments, the refractive index of the marking 116 differs from the refractive index of the unmarked portion of the body 102 by greater than about $1\times10^{-4}$, by greater than about $5\times10^{-4}$, by greater than about $10\times10^{-4}$, or by greater than about $15\times10^{-4}$. Without being bound by theory, a difference in the refractive indices of the marking and the unmarked portion of the body 102 of greater than about $1\times10^{-4}$ may be relatively easily detected using illumination with laser light. In some embodiments, the marking 116 may be written at a velocity of from about 10 mm/s to about 1,000 mm/s, from about 10 mm/s to about 50 mm/s, or from about 150 mm/s to about 200 mm/s.

The embodiment depicted in FIG. 6 also includes a CCD camera 610 and a beam shaping system 612. In various embodiments, the CCD camera 610 may be used to obtain a live view of the laser writing system 600, such as to monitor the process. For example, the CCD camera 610 may be positioned to receive light reflected by filter 606 which light may be indicative of the pattern being written within the glass container. The optional beam shaping system 612 may be used to produce a desired beam shape for writing. For example, the beam shaping system 612 may be used to form a beam having an elongated shape when incident on the glass. The beam shaping system 612 may include one or more cylindrical lenses or other optical elements capable of shaping the beam emitted by the laser. The beam shape may be varied depending on the beam translation speed, the thickness of the glass sheet, the laser power, and the like, to achieve the desired effect.

Although various embodiments employ a femtosecond laser, it should be understood that other types of lasers, such as UV lasers, may be employed. For example, in some embodiments, a UV laser may be employed to densify the portion of the glass to form the marking 116. The UV laser may be, for example, a laser having a wavelength of less than or equal to about 300 nm and a pulse duration of greater than about 5 ns and less than about 60 ns. The UV laser may be translated such that it has a scan speed of from about 1 µm/s to about 1 mm/s. In some embodiments, the focused laser beam has an intensity in the range from about 10 mJ/cm² to about 150 mJ/cm². As with the femtosecond laser, it is to be understood that the particular parameters employed may vary depending on the particular glass composition of the glass container.

Figure 7:
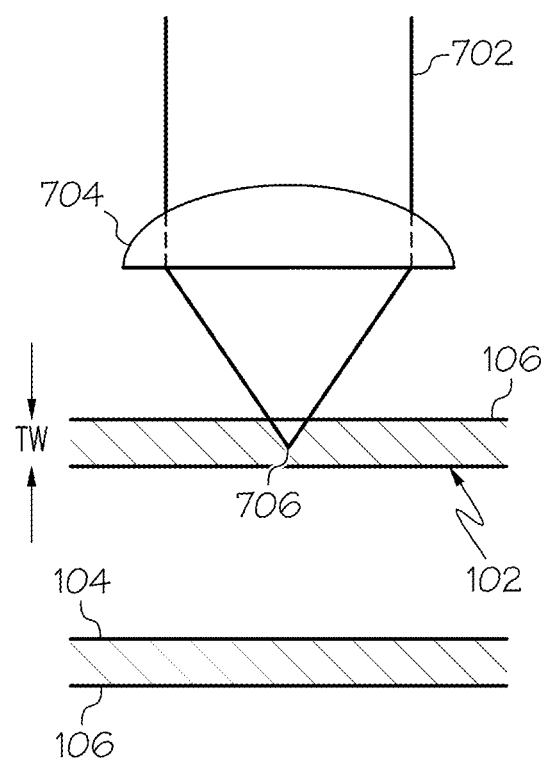
FIG. 7 schematically depicts another laser writing system for generating a marking in accordance with one or more embodiments described herein.

In some embodiments, a nanosecond UV laser which provides a nanosecond pulsed beam may be used to form the marking 116 in the glass by focusing the laser beam 702 within the thickness $T_w$ of the body 102 using a lens 704, as depicted in FIG. 7. In various embodiments, the marking 116 is formed in the body 102 prior to the annealing step 510. In particular, the nanosecond UV laser may be a Nd-based laser operated at a wavelength of about 355 nm. It is contemplated that the nanosecond UV laser may be operated at other wavelengths, depending on the particular embodiment. In various embodiments, the laser has a power of from about 2 W to about 4 W, from about 2.5 W to about 3.5 W, or about 3 W. In some embodiments, the laser may have a pulse duration of from about 25 ns to about 50 ns, or from about 30 ns to about 40 ns, although other pulse durations may be employed. The laser may be operated at a repetition rate of from about 80 kHz to about 300 kHz, or from about 100 kHz to about 200 kHz. In various embodiments, the repetition rate is chosen based on a target stress, or stress threshold, in the glass. For example, the repetition rate may be selected to minimize the stresses introduced into the glass.

The lens 704 may be an aspherical lens with a numerical aperture in a range of from 0.3 to 0.7, or from 0.4 to 0.6, or about 0.5. Without being bound by theory, it is believed that a numerical aperture in this range causes the laser beam 702 to enter the glass body 102 at an angle sufficient to cause the power density at the outer surface 106 of the glass to be much lower than the power density at the focus 706 of within the thickness $T_w$ of the glass body 102, which in turn may result in a minimal effect on the surface of the glass while enabling the laser to create the marking in the form of an interstitial void within the glass.

The laser beam 702 may be translated with respect to the glass wall at a speed of from about 20 mm/s to about 3 mm/s, 10 mm/s to about 4 mm/s, from about 9 mm/s to about 5 mm/s, or about 7 mm/s, in some embodiments. In some embodiments, the laser beam 702 may be moved relative to the body 102, while in other embodiments, the body 102 may be moved relative to the laser. For example, in some embodiments, the glass body 102 may be rotated at a linear speed of from about 3 mm/s to about 20 mm/s relative to the laser beam to cause translation of the laser beam with respect to the glass wall. In some particular embodiments, the translation of the laser beam 702 and/or the glass may be effected using a computer controlled XYZ stage, such as motion stage 608 described above in accordance with FIG. 6. In some embodiments, the marking may be formed in the glass while the glass is maintained at an elevated temperature. For example, the laser beam 702 may be used to form the marking in the glass while the glass is maintained at a temperature from about room temperature (i.e., about 23° C.) to about 0.5° C. below the melting point of glass.

Figure 8A:
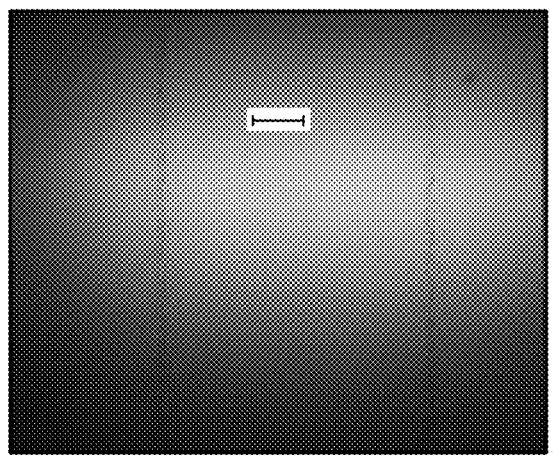
FIG. 8A depicts one example of a marking prior to annealing in accordance with one or more embodiments described herein.
Figure 8B:
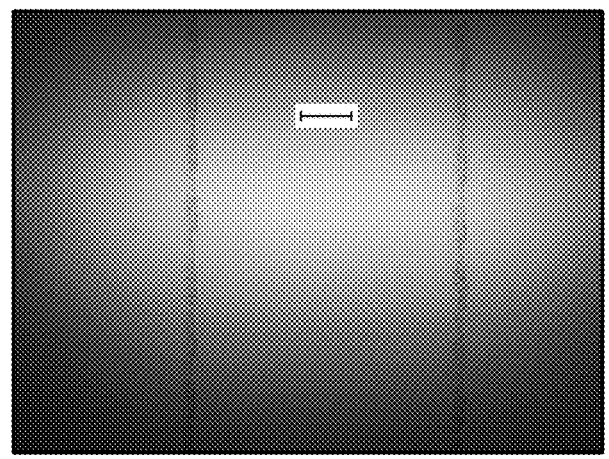
FIG. 8B depicts the example of the marking of FIG. 8A after annealing in accordance with one or more embodiments described herein.
Figure 8C:
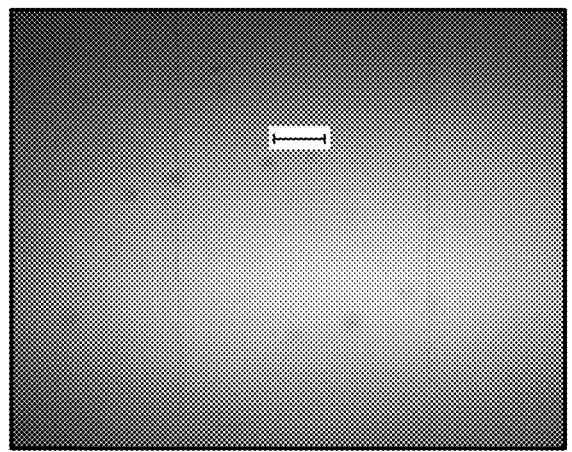
FIG. 8C depicts another example of a marking prior to annealing in accordance with one or more embodiments described herein.
Figure 8D:
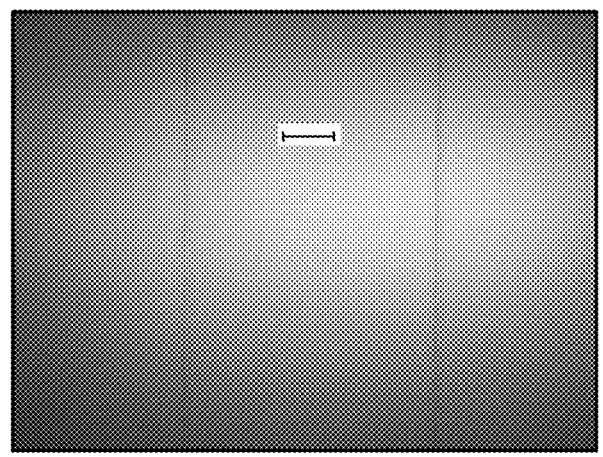
FIG. 8D depicts the example of the marking of FIG. 8C after annealing in accordance with one or more embodiments described herein.

As an example, a 355 nm laser was focused into approximately the center of the thickness of a glass wall with an aspheric lens having a numerical aperture of 0.5. The laser power was set to 3 W, and the repetition rate was 100 kHz. The glass was in the form of a glass vial having a 16 mm diameter prior to annealing, and before ion-exchange. The glass was transparent with greater than about 95% internal transmission. The glass vial was rotated at a linear speed of 7 mm/s and 5 mm/s, and the results are depicted in FIG. 8A and FIG. 8C, respectively. The glass vials were then subjected to an annealing step at 627° C., and the glass vials including the markings after annealing are depicted in FIGS. 8B and 8D, respectively. As shown in FIGS. 8A and C, prior to annealing, the marking has a visible bubble-like central section surrounded by semi-transparent fields, which at least partially disappear after annealing (FIGS. 8B and D). The marking formed at a lower translation speed (FIGS. 8C and D) is thinner and the semi-transparent fields appear more uniform, although they do not completely disappear after annealing (FIG. 8D). Without being bound by theory, it is believed that such markings do not include visible microcracks and do not induce significant amounts of stress. Accordingly, it is believed that any induced stress may be further reduced or even eliminated by annealing. Moreover, it is believed that because ion exchange is performed at temperatures below the annealing temperature, the marking will not degrade after ion exchange.

In some embodiments, a unique identifier is coded into the marking. The unique identifier may, by way of example and not limitation, be suitable to provide resolution at a level of billions of unique identifications, and may be coded into the marking by way of the shape, structure, or resonance of the mark. The unique identifier may correspond to encoded product information, lot number, shipment information, or the like. Alternatively or in addition, the unique identifier may directly encode part manufacturing information such as a date of manufacture, the plant of origin, and the like. The amount of information required to be encoded in any particular barcode mark will vary depending upon the requirements of the particular tracking system to be employed. As but one example, the unique identifier may be in the form of a one-dimensional (1-D) or two-dimensional (2-D) barcode. Two-dimensional marks encoding from as few as 10 numerical digits or less to as many as 36 alphanumeric digits or more are useful for the tracking of pharmaceuticals, with marks encoding 16 alphanumeric digits being considered typical. Sixteen-digit patterns can incorporate sufficient information for most manufacturing purposes, are readily printable in machine-readable sizes within the glass.

Accordingly, in such embodiments, a code reader may be employed to observe and decode the marking.

As described hereinabove, various embodiments enable a marking in the form of a microstructure to be formed within the wall thickness $T_w$ of a glass container. In some embodiments, the marking is visible to the human eye without the use of additional equipment. However, in some other embodiments, a specially-designed optical imaging system may be required to observe the marking and/or decode information encoded within the marking. FIG. 7 schematically depicts an exemplary code reader that may be used to observe a marking. For example, the exemplary code reader may be used to decode information encoded in the marking 116.

Figure 9:
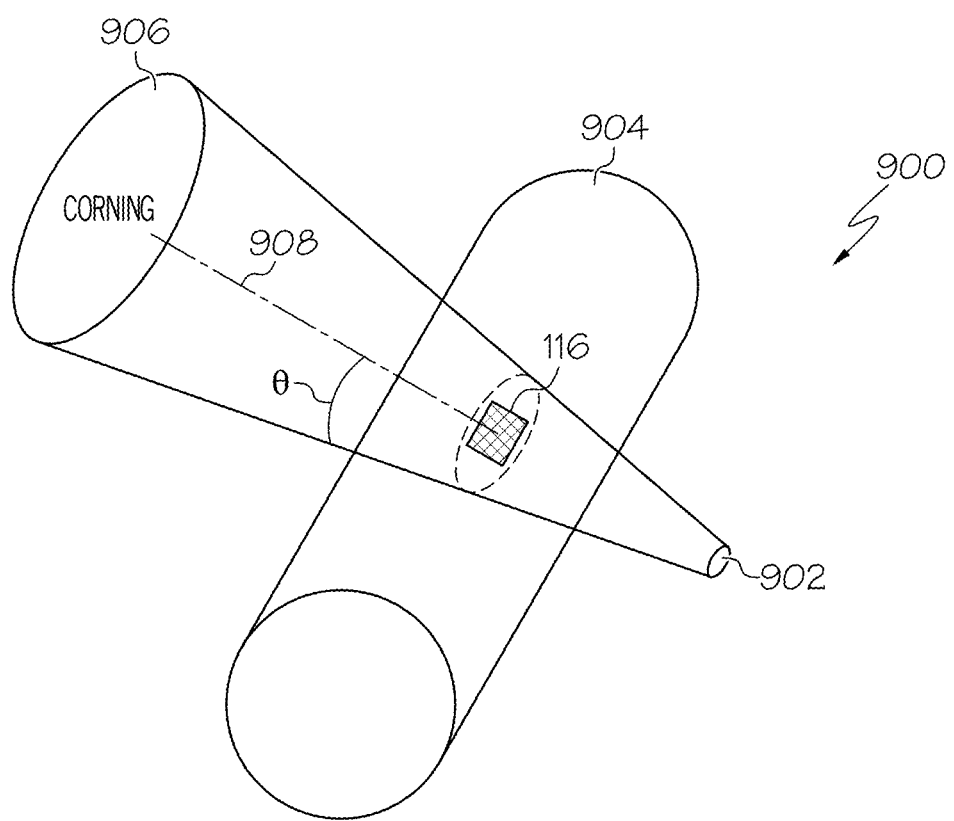
FIG. 9 schematically depicts an optical imaging system for decoding information encoded in a marking in accordance with one or more embodiments described herein.
Figure 10:
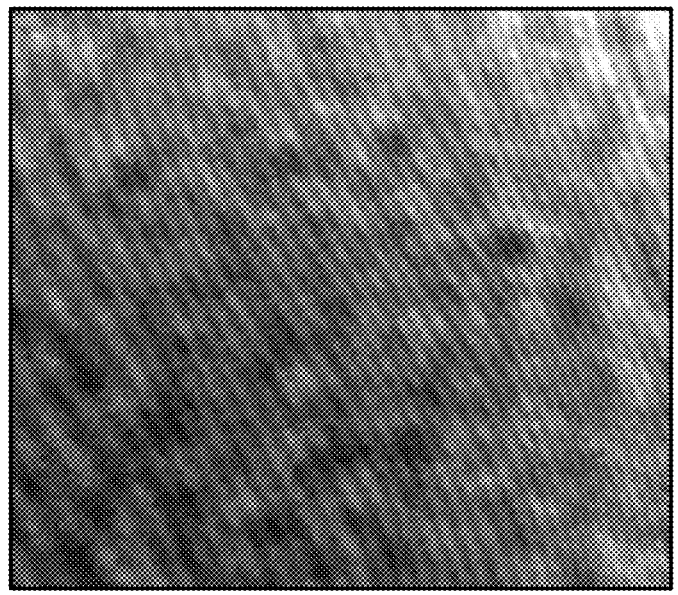
FIG. 10 depicts an exemplary marking in the form of a microstructure in accordance with one or more embodiments described herein.

As shown in FIG. 9, system 900 relies on light reflected from the marking 116 to reconstruct encoded information. In various embodiments, in order to encode product information, such as described in embodiments hereinabove, the marking 116 has a feature size less than the wavelength of a detection light source 902. For example, for a detection light source 902 having a wavelength of 600 nm, the marking 116 should include features less than 600 nm. An exemplary marking 116 in the form of a microstructure is depicted in FIG. 10.

In some embodiments, product information is encoded in the marking 116 using the intensity and phase information. Thus, the information encoded in the marking 116 cannot be revealed with a conventional optical microscope which can view only intensity information. Accordingly, the information encoded in the microstructure may be decoded only when the laser wavelength and phase (i.e., position and angle) matches the laser wavelength and phase used to generate the microstructure. Specifically, in order to decode the encoded information, the light from the detection light source 902 is directed onto the surface under detection 904 (e.g., the wall portion 110 of the glass container 100). The surface under detection 904, and in particular, the marking 116, reflects the light, which is reconstructed by the system 900 on the image plane 906 to reveal the encoded information.

In some embodiments, the surface under detection 904 is positioned between the light source 902 and the image plane 906 such that the marking 116 is projected onto the image plane 906 by backlighting. In embodiments, the marking 116 within the surface under detection 704 may be invisible (e.g., not detectable or visible) through direct inspection or by direct illumination with white light, UV light, or UV laser. In some embodiments, the marking 116 may further be invisible when backlit using white light, UV light, or a UV laser. Accordingly, the marking 116 of various embodiments may only be detected through projection using particular light sources and configurations.

In various embodiments, the light source 902 may be a laser, such as a helium-neon (HeNe) laser. However, it should be understood that the laser may be any type of laser, including a diode pump laser source, a solid state laser source, or a gas laser source. In embodiments employing a HeNe laser, the laser may have a wavelength of from about 400 nm to about 1,000 nm and be operated at a power of from about 1 µW to about 100 mW.

The light source 902 may project the marking 116 within the surface under detection 904 at a projection angle θ of from about 0° to about 45° onto the image plane 906. In embodiments, the projection angle θ may be from greater than 0° to about 45°, from about 1° to about 40°, from about 1° to about 20°, from about 5° to about 45°, or from about 1° to about 5°. As used herein, the "projection angle" θ refers to the angular spread of light and is a measure of divergence of the light emitted from the light source 902 from a central axis 908. For example, a projection angle θ of 0° results in a collimated light beam extending from the marking 116.

In operation, the light source 902 is directed toward the surface under detection 904 at the projection angle θ, and the marking 116 is projected onto the image plane 906. The image plane 906 may be, for example, a projection screen, a solid surface, or a surface coupled to a detection system. The detection system may be, for example, a camera with image processing capabilities.

In some embodiments, the marking 116 may be a composite marking. As used herein, a "composite marking" includes two markings or more markings positioned on or within opposing surfaces that produce a final coherent marking when properly displayed. For example, the composite marking may include a first marking (sometimes referred to herein as a "first portion of the marking") positioned within a first surface of a glass container and a second marking (sometimes referred to herein as a "second portion of the marking") positioned within a second, opposing, surface of the glass container. Although "first" and "second" surfaces are referenced, it is to be understood that the first and second markings may be positioned on or within the same surface of the glass container at different locations such that the markings oppose one another. In embodiments in which the marking 116 is a composite marking including two opposing markings, when the glass container is backlit using the light source 902 at a predetermined projection angle, the composite marking is projected onto the image plane 906. When the projection angle is incorrect, or when the first and second portions of the composite marking are not properly positioned, such as may be the case in counterfeit glass containers, the composite marking projected onto the image plane 906 will not appear correctly. In other words, the both of the first and second portions of the composite marking are needed to produce a coherent composite marking. Accordingly, in some embodiments, the first portion of the composite marking may differ in size or thickness from the second portion of the composite marking such that a predetermined projection angle causes the composite marking to be properly projected.

For example, the letters "C," "R," "I," and "G" may make up the first portion of the marking 116, while the letters "O," "N," and "N" may make up the second portion of the marking 116. When properly aligned and projected, the marking 116 may reveal "CORNING" on the image plane 906. However, overlapping letters, missing letters, or variations in the sizing of the letters when properly backlit may reveal a counterfeit container. As another example, part of a 2D barcode may make up the first portion of the marking 116 and another part of the 2D barcode may make up the second portion of the marking 116 such that when properly illuminated, the 2D barcode is projected onto the image plane 906.

Other detection systems may be employed, depending on the particular embodiment. For example, in some embodiments, differential interference contrast (DIC), or Nomarski, microscopy may be used to detect the marking 116. In DIC microscopy, the illumination light beam is split up into two beams that are given different polarizations, are phase shifted differently, and are shifted transversely by slightly different amounts. The two beams are passed through the specimen where they experience different optical path lengths where the areas differ in refractive index (e.g., the marked and unmarked portions of the glass body). After passing through the specimen (e.g., the glass container), the two beam parts are made to interfere, giving an image of the derivative of the optical path length in the direction of the difference in transverse shift, thereby rendering the marking 116 visible. Additional details on DIC microscopy may be found in "Differential interference contrast (DIC) microscopy and modulation contrast microscopy" from Fundamentals of Light Microscopy and Digital Imaging (New York: Wiley-Liss, pp 153-168), which is hereby incorporated by reference.

In various embodiments, the detection of the marking is enhanced by the glass composition or other processes performed on the glass. For example, in some embodiments, the inclusion of Sn in the glass composition may enhance UV detection of the marking 116. In other embodiments, detection of the marking 116 may be enhanced by the stress field imparted by strengthening the glass or by a low coefficient of friction (COF) coating applied to the surface of the glass. The glass may undergo other processing steps to enhance detection of the marking 116, depending on the particular embodiment.

Accordingly, various embodiments described herein may be employed to produce markings within the wall thickness of a glass container. Various embodiments enable covert, overt, and combinations of covert and overt markings to be formed within glass containers that are particularly well-suited for the formation of pharmaceutical packages. Thus, the markings may be used to track individual packages, products, lots, or manufacturers and/or to indicate the authenticity of a product. Various embodiments described herein may deter counterfeiting by its presence. For example, a marking within the glass may be much more difficult to duplicate than an adhesive label or marker on the label and/or the high cost of the laser may act as a deterrent to counterfeit or illegally duplicate the mark.

Additionally, the method of forming the marking in the glass as described in various embodiments herein may also be more compatible with surface strengthening methods (such as ion exchange) because the marking is embedded in the thickness of the glass, rather than on the surface. Moreover, because the marking is embedded in the thickness of the glass, it is compatible with thermal processes for a glass article. The specific glass composition or an ion exchanged glass composition may provide unique benefits related to the introduction of surface damage (which should be minimized) and bulk damage which results in the refractive index change of at least about $10^{-4}$ (which should be maximized) for efficiency. For example, in various embodiments described herein, the marking minimally affects glass strength due to the location of the marking within the bulk substrate and results in negligible damage to the surface. Thus, in various embodiments, the inclusion of the marking in the glass container does not impact the glass strength or surface effects, such as delamination or damage resistance. The sub-surface defects may, in some embodiments described herein, affect crack propagation rate and direction which could provide unique properties to the product that may be used to detect the mark or provide confirmation of authenticity. For example, in some embodiments, the stress field imparted by the strengthening of the glass may enhance detection of the mark.

Although various embodiments described herein include markings that are positioned within the thickness of the wall of a glass container, other embodiments may utilize a laser to create a marking by selectively removing a coating from the surface of the glass container. Without being bound by theory, ion-exchange strengthened glass is UV fluorescent when excited by UV wavelengths, and specifically UVC wavelengths, while coatings, such as the polymer (e.g., polyimide) coatings that may be included on the surface of the glass container, such as those described in greater detail above, are UV absorbing. It is believed that the glass may exhibit UV fluorescence due to the presence of glass defects or impurities, and that ion-exchange processes may increase the intensity of fluorescence because of the formation of additional non-uniformities in the glass. Accordingly, the coating may absorb UV light that would otherwise excite the ion-exchange strengthened glass or non-ion-exchanged glass, thereby blocking the UV excitation of the glass and, thus, reducing or eliminating the UV fluorescence of the glass. Appropriate selection of the UV excitation wavelength, where both fluorescence excitation intensity and UV absorption by the polymer are maximized, will create the highest contrast in fluorescence intensity image. Therefore, in some embodiments, a laser may be used to remove the coating to create a marking 116 that is invisible in normal lighting, but detectable using UV light.

The laser ablation threshold for polymers and glass may differ by an order of magnitude or more. Therefore, it is possible to ablate the polymer without affecting the glass surface and without creating undesirable cracks by selecting appropriate focusing conditions and laser intensity. In such embodiments, the laser may be a pulsed laser such as, by way of example and not limitation, a UV Q-switch laser. The laser may be operated at an average power of less than about 1 W. For example, the laser may have an average power of from about 20 mW to about 500 mW, from about 75 mW to about 250 mW, or from about 100 mW to about 200 mW with a focus spot at the surface of from about 200 µm to about 300 µm in diameter. In some embodiments, the laser may have an average power of less than about 200 mW or less than about 100 mW. The laser may have a wavelength of from about 193 nm to about 2000 nm, or from 355 nm to about 1064 nm. For example, the laser may have a wavelength of about 193 nm, 266 nm, 355 nm, 532 nm, 1064 nm, 1550 nm, or the like. In particular embodiments, the wavelength is from about 248 nm to about 355 nm. The writing speed of the laser may be from 2 mm/s to 50 mm/s, greater than about 50 mm/s, greater than about 100 mm/s, greater than about 500 mm/s, greater than about 1 m/s, or even greater than about 2 m/s. In some embodiments, the writing speed of the laser is between about 10 mm/s and 1,000 mm/s. The repetition rate may be from 100 Hz to 10,000 kHz or from 1 kHz to 2,000 kHz. In some embodiments, for example, the repetition rate is about 30 kHz, although other repetition rates are contemplated. The laser may be focused to a spot size of less than about 2 µm or less than about 1 µm. In some embodiments, the laser is focused to a spot size of from about 0.5 µm to about 1 µm, although other resolutions are possible depending on the writing speed, laser wavelength, and desired marking size. The laser may be directed through a lens for focusing, although some embodiments do not include a lens.

It is contemplated that other laser parameters may be employed, depending on the particular spot desired and laser employed, provided that the laser has a power density per pulse that exceeds the power density per pulse threshold for coating ablation. For example, in embodiments in which the coating is a polyimide-based coating, the laser should have a power density per pulse that exceeds the power density per pulse threshold for polyimide ablation of approximately $0.025$ J/cm$^2$ or higher with a 10 ns pulse duration. The power density per pulse threshold may vary depending on the particular coating employed. Without being bound by theory, the difference in ablation thresholds of the coating and glass may enable the marking to be formed on a curved surface without rotation of the glass container. For example, the laser may have a depth of focus of about 0.5 mm that enables it to be used to ablate the coating through the glass without creating non-uniformities in the glass surface.

In some embodiments, the laser may completely remove the coating from the surface of the glass container 100 by ablation to form the marking 116. However, in other embodiments, the marking 116 may be formed by partially removing the coating to modify the fluorescence of the glass container 100 or by otherwise creating a pattern in the coating. In some embodiments, the coating is removed to generate a difference in UV absorption between the unmarked and marked portions of the glass container 100 of greater than about 10%. Accordingly, the coating may be removed to generate a difference in UV absorption between the unmarked and marked portions of the glass container 100 of from about 5% to 100%, from about 10% to 100%, from about 15% to about 90%, from about 20% to about 80%, from about 50% to about 75%, or from about 60% to about 70%. In some embodiments, the coating is removed to generate a difference in UV-induced fluorescence between the unmarked and marked portions of the glass container 100 of greater than about 10%. Accordingly, the coating may be removed to generate a difference in UV-induced fluorescence between the unmarked and marked portions of the glass container 100 of from about 10% to 100%, from about 15% to about 90%, from about 20% to about 80%, from about 50% to about 75%, or from about 60% to about 70%.

In embodiments in which the marking 116 is created by ablating the coating on the glass container 100, the marking 116 may be detected by observing the UV fluorescence of the marking 116. In embodiments, the glass container 100 may be illuminated with UV light at a wavelength of less than or equal to about 400 nm, and fluoresces at a wavelength of greater than or equal to 400 nm at portions where it is not coated with a polymer-based coating. For example, a UV light sensor 1100, such as that depict in FIG. 11, may be employed.

Figure 11:
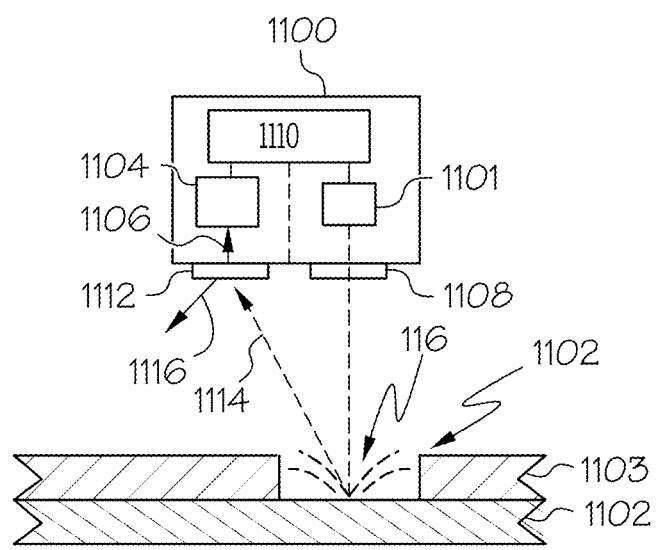
FIG. 11 schematically depicts an ultraviolet light sensor for detecting the markings in accordance with one or more embodiments described herein.

Referring now to FIG. 11, the UV light sensor 1100 is depicted in greater detail. In various embodiments, the UV light sensor 1100 is a luminescence sensor which emits UV light and detects the resulting visible glow caused by the interaction of the UV light with a phosphorescent material, such as the glass body 102. In particular, the UV light sensor 1100 detects the resulting visible glow caused by the interaction of the UV light in areas of the glass body 102 where the coating 1103 has been removed, thinned, or otherwise modified to permit the passing of UV light through the coating 1103. In embodiments, the UV light sensor 1100 may emit UV light at one or more wavelengths of less than about 400 nm, less than about 350 nm, or less than about 318 nm. For example, the UV light sensor 1100 may emit light at a wavelength of from about 150 nm to about 400 nm, from about 175 nm to about 350 nm, from about 200 nm to about 318 nm, or from about 225 nm to about 275 nm. In one particular embodiment, the UV light sensor 1100 emits light at a wavelength of about 250 nm.

In various embodiments, the UV light sensor 1100 includes a UV light source 1101, which emits UV light 1102, a photodetector 1104 (such as a photo diode or the like) that detects visible light 1106 emitted by the target (e.g., the glass body 102) when the UV light 1102 is incident on the target, and a lens 1108 that directs the UV light 1102 toward the target (e.g., the glass body 102). The UV light source 1101 may be, for example, a mercury lamp with a UV filter or a UV LED. The UV light sensor 1100 may further include an electronic circuit 1110 that provides power to the UV light source 1101 and photodetector 1104 and produces an output indicative of detected light. In embodiments, the UV light sensor 1100 further includes a dichroic mirror 1112 that separates the reflected light 1114 into UV light 1116, which is directed away from the photodetector 1104, and visible light 1106, which is directed toward the photodetector 1104.

As an alternative to using the UV light sensor 1100 of FIG. 11, in some embodiments, a UV light source may be used to illuminate the marking 116 and the fluorescence may be detected with the human eye or through the use of another type of camera or optical detector. In some embodiments, the marking 116 may be detected using existing portable counterfeiting equipment, such as the FDA's CD-3 handheld device, or the like, provided the detector is capable of detecting a difference in fluorescence between the coating and the glass container.

As one example, a UV pulsed laser was focused through a lens into a glass body 102 including a polyimide coating 1103 on the surface thereof. The laser was a Q-switch UV laser with a wavelength of 355 nm. The repetition rate of the laser pulses was 30 kHz, and the average energy of the laser was 100 mW. The marking 116 to be made on the surface of the glass body 102 by removing the polyimide coating 1103 was programmed into a laser scanner which directed the laser to a specific location on the surface of the glass body 102 where the coating was removed from the glass with the laser by ablation. The processing speed of the laser was 50 mm/s, and the focus lens had a focal length of 150 mm.

Figure 12A:
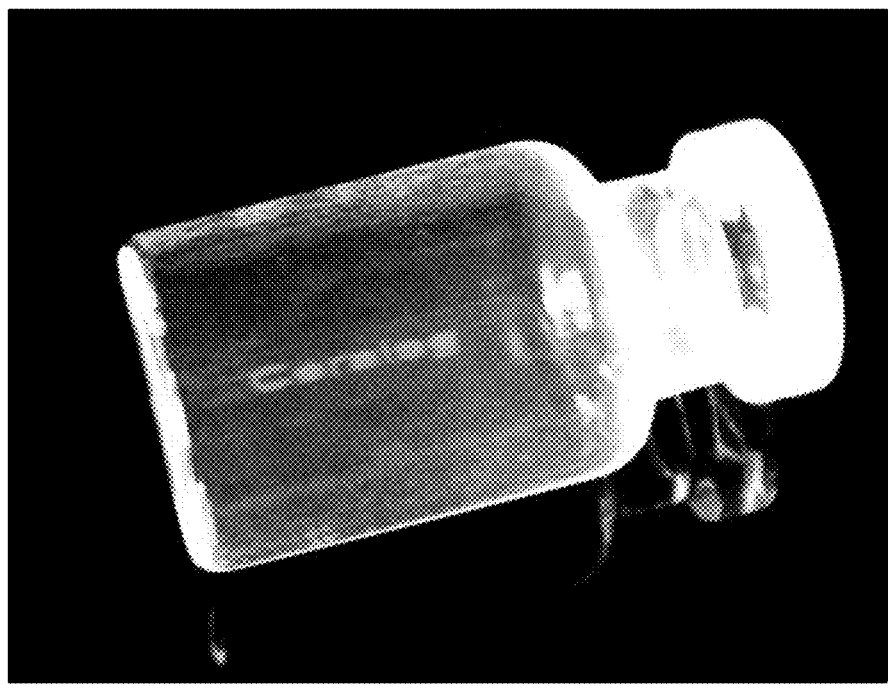
FIG. 12A depicts one example of a marking in accordance with one or more embodiments described herein.
Figure 12B:
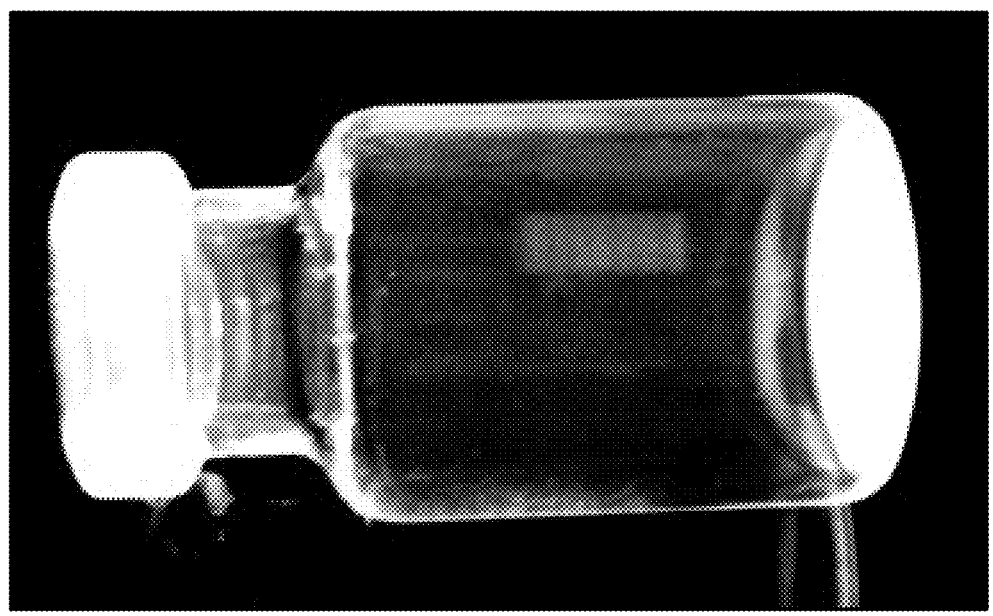
FIG. 12B depicts another example of a marking in accordance with one or more embodiments described herein.

After marking the glass body 102, an optical imaging system using a 250 nm wavelength and 6 W electrical power lamp was used to excite fluorescence in the glass body 102. Areas where the polyimide coating 1103 was removed from the glass body 102 exhibited a fluorescence intensity contrast of greater than about 2:1. FIGS. 12A and 12B depict the fluorescence of the marking in contrast to the glass body 102. In particular, in FIG. 12A, the marking 116, "Corning," is visible when exposed to UV light. In FIG. 12B, the marking 116 was in the form of a barcode that was visible when exposed to UV light.

Although various embodiments have been described in which ablation is used to create a marking, such as an alpha numeric marking, in the coating, it is contemplated that in some embodiments, the marking may be in the form of a pattern formed in the coating. The pattern may be, for example, a one-dimensional or two-dimensional barcode, or another predetermined pattern. As described above, the coating need not be completely removed in some embodiments. Thus, the marking may be a pattern created from ablation of different amounts of the coating from the surface of the glass. For example, the marking may be a pattern in which an increasing amount of the coating is removed over a particular distance or the marking may be an alternating pattern of spots having different amounts of the coating removed. Accordingly, in the embodiments described herein, the marking may be in the form of an image, a pattern, a shape, or a gradient, for example.

In addition to producing markings on glass containers, in some embodiments, laser removal of the polymer coatings may be used for process control. For example, in various embodiments, the polymer coating may be applied to the glass container using a spray process in which over-spray may cause the coating material to be deposited in unwanted locations in and on the glass container. For example, the coating material may inadvertently be deposited on a sealing surface or on the interior of a container. Accordingly, laser ablation may provide a reliable removal method to ensure that the coating does not interfere with downstream processing or become a potential contaminate.

Moreover, selective removal of a polymer coating may be employed in conjunction with optical or mechanical profilometry to determine coating thickness. Without being bound by theory, coatings that are thin, multi-layer, or are variable in coverage and/or thickness may be difficult to measure by conventional interferometry or profilometry. Accordingly, by using the laser to remove a portion of the coating, a step change may be measured, such as within on-line optical inspection during manufacturing.

In various embodiments described herein, because the marking is made by a laser, it can easily be adjusted for different shapes, patterns to easily uniquely mark product, lot or manufacturer. Additionally, the use of a laser to generate the marking enables the marking to be located in an area that is less sensitive to various stresses.

Various embodiments described herein may also extend traceability through the product life cycle by marking the substrate prior to filling the substrate with product. In particular, covert or overt anti-counterfeiting markings located within the thickness of the substrate with unique individual part identifiers may enable improved traceability in manufacturing processes and in pharmaceutical filling and packaging operations and/or enable improved traceability for investigative purposes in the field. Various embodiments described herein further comply with regulatory 'track and trace' requirements.

Covert markings located within the thickness of the substrate that are encoded with unique lot, product, or manufacturer may further prevent interrogation, duplication and could aid investigations of counterfeit products. For example, according to some embodiments, the photonic microstructures may only be visible with special equipment enabling access control to interrogation/information or even knowing its presence.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A pharmaceutical package comprising:
    a glass body having a delamination factor of less than or equal to 10, the glass body having an outer surface, the composition of the glass body at least partially phosphorescent under ultra-violet (UV) light;
    a polymer-based coating disposed on at least a portion of the outer surface of the glass body;
    an exposed portion of the outer surface of the glass body within a region of the polymer-based coating; and
    a marking provided by the exposed portion of the outer surface of the glass body seen through the polymer-based coating that is visible to the naked eye; and
    a covert marking, consisting of the phosphorescence of outer surface of the glass body exposed through the polymer-based coating that is only visible when the glass body is exposed to ultra-violet (UV) light.

2. The pharmaceutical package of claim 1, wherein the polymer-based coating comprises a polyimide coating.

3. The pharmaceutical package of claim 1, wherein the marking enables the pharmaceutical package to be traced through a manufacturing process, a filling process, or in a field of use.

4. The pharmaceutical package of claim 1, wherein the glass body is formed from an alkali-aluminosilicate glass composition.

5. The pharmaceutical package of claim 1, wherein the marking has a difference in UV absorption of greater than about 10% compared to a UV absorption of an unmarked portion of the pharmaceutical package.

6. The pharmaceutical package of claim 5, wherein the difference in UV absorption is from about 15% to about 90%.

7. The pharmaceutical package of claim 5, wherein the difference in UV absorption is from about 50% to about 75%.

* * * * *